United States Patent
Ansari

(10) Patent No.: US 12,532,891 B2
(45) Date of Patent: Jan. 27, 2026

(54) INSECT-PATHOGENIC FUNGUS, SPORES, COMPOSITION AND USE OF SAME

(71) Applicant: Syngenta Crop Protection AG, Basel (CH)

(72) Inventor: Minshad Ali Ansari, Swansea (GB)

(73) Assignee: SYNGENTA CROP PROTECTION AG, Basel (CH)

( * ) Notice: Subject to any disclaimer, the term of this patent is extended or adjusted under 35 U.S.C. 154(b) by 1000 days.

(21) Appl. No.: 17/276,274

(22) PCT Filed: Sep. 13, 2019

(86) PCT No.: PCT/GB2019/052584
§ 371 (c)(1),
(2) Date: Mar. 15, 2021

(87) PCT Pub. No.: WO2020/053603
PCT Pub. Date: Mar. 19, 2020

(65) Prior Publication Data
US 2022/0264895 A1  Aug. 25, 2022

(30) Foreign Application Priority Data
Sep. 14, 2018 (GB) ...................................... 1815025

(51) Int. Cl.
*A01N 63/30* (2020.01)
*A01N 25/04* (2006.01)
(Continued)

(52) U.S. Cl.
CPC ............. *A01N 63/30* (2020.01); *A01N 25/04* (2013.01); *A01N 59/16* (2013.01); *A01N 59/20* (2013.01);
(Continued)

(58) Field of Classification Search
CPC .............. C12N 1/145; C12R 2001/645; A01N 63/30; A01N 25/04; A01N 59/16; A01N 59/20; A01P 7/04
See application file for complete search history.

(56) References Cited

U.S. PATENT DOCUMENTS

| 5,360,607 A | * | 11/1994 | Eyal | ........................ | A01N 63/30 435/174 |
| 2004/0101516 A1 | | 5/2004 | Shapiro-Ilan et al. | | |
| 2014/0302135 A1 | * | 10/2014 | Durvasula | .............. | A01N 25/26 424/463 |

FOREIGN PATENT DOCUMENTS

| CN | 103828842 | 6/2014 |
| CN | 104611240 | 5/2015 |

(Continued)

OTHER PUBLICATIONS

M.A. Ansari, F.A. Shah, M. Whittaker, M. Prasad, T.M. Butt, Control of western flower thrips (*Frankliniella occidentalis*) pupae with Metarhizium anisopliae in peat and peat alternative growing media, 2007, Biological Control, vol. 40, pp. 293-297 (Year: 2007).*

(Continued)

*Primary Examiner* — David W Berke-Schlessel
*Assistant Examiner* — Trent R Clarke
(74) *Attorney, Agent, or Firm* — BakerHostetler; Toni-Junell Herbert

(57) ABSTRACT

Novel strains of the insect-pathogenic fungus, *Metarhizium* var. *anisopliae* fungal strain BNL 101 deposited in the CABI UK Centre, United Kingdom, having IMI CC Number 506833; or BNL 102 deposited in the CABI UK Centre, United Kingdom, having IMI CC Number 506834; or a culture having the identifying characteristics thereof, are disclosed. The present invention also discloses methods of using the fungal strains, and spores obtained therefrom, to (Continued)

control insects, and provides a natural pest control preparation. The preparations and compositions comprise several unique and desirable features, such as a wide host range or alternatively a selective host range, and a consistent pathogenicity. The preparations and compositions have a high virulence (insecticidal activity), that is 2 times to 3 times, or greater, mor virulent (insecticidal) than compositions or preparations that do not contain the preparation or composition, and especially that do not contain the BNL 101 or BNL 102 fungal strain, or spores therefrom. The fungal strains also provide for a high spore yield in production, and possess a high stability in the field.

16 Claims, 37 Drawing Sheets

(51) Int. Cl.
    *A01N 59/16*    (2006.01)
    *A01N 59/20*    (2006.01)
    *A01P 7/04*     (2006.01)
    *C12N 1/14*     (2006.01)
    C12R 1/645      (2006.01)

(52) U.S. Cl.
    CPC ............... *A01P 7/04* (2021.08); *C12N 1/145* (2021.05); *C12R 2001/645* (2021.05)

(56) References Cited

FOREIGN PATENT DOCUMENTS

| | | |
|---|---|---|
| CN | 105123766 | 12/2015 |
| CN | 105918355 | 9/2016 |
| CN | 106561718 | 4/2017 |
| CN | 107365710 | 11/2017 |
| EP | 2078746 | 7/2009 |
| EP | 2859794 | 4/2015 |
| WO | WO 02/087344 | 11/2002 |
| WO | WO 2009/050482 | 4/2009 |
| WO | WO 2016/001125 | 1/2016 |
| WO | WO 2017/200563 | 11/2017 |
| WO | WO 2018/147671 | 8/2018 |
| WO | WO 2020/053603 | 3/2020 |
| WO | WO 2020/193969 | 10/2020 |

OTHER PUBLICATIONS

Metarhizium anisopliae strain F52 (029056) Biopesticide Fact Sheet, is a pdf from the EPA, accessed at https://www3.epa.gov/pesticides/chem_search/reg_actions/registration/fs_PC-029056_18-Apr. 11.pdf, on Feb. 22, 2024, online since Apr. 11, 2018 (Year: 2018).*
Ramle Moslim and Norman Kamarudin, The use of palm kernel cake in the production of conidia and blastospores of *Metarhizium anisopliae* var. major for control of Oryctes rhinoceros, 2014, Journal of Oil Palm Research, vol. 26(2), pp. 133-139 (Year: 2014).*
Patents Act 1977: Examination Report Under Section 18(3) Dated Nov. 13, 2020 From the Intellectual Property Office of the United Kingdom of Great Britain Re. Application No. GB 1815025.0. (4 Pages).
International Search Report and the Written Opinion Dated Dec. 5, 2019 From the International Searching Authority Re. Application No. PCT/GB2019/052584. (12 Pages).
Patents Act 1977: Search Report under Section 17(5) ) Dated Sep. 5, 2019 From the Intellectual Property Office of the United Kingdom of Great Britain Re. Application No. 1904086.4. (4 Pages).
Fargro "Technical Notes for Met52 Granular Bionsecticide", Tech-Met52 Granular, pm-01/14: 1-8, Jan. 1, 2014.
Gul et al. "Entomopathogenic Fungi as Effective Insect Pest Management Tactic: A Review", Applied Sciences and Business Economics, 1(1): 10-18, 2014.
Liu et al. "Formulation and Characterization of the Microencapsulated Entomopathogenic Fungus Metarhizium Anisopliae MA 126", Journal of Microencapsulation, 26(5): 377-384, Oct. 20, 2008.
Noble et al. "Improving Biocontrol of Black Vine Weevil (*Otiorhynchus sulcatus*) with Entomopathogenic Fungi in Growing Media by Incorporating Spent Mushroom Compost", BioControl, 63:697-706, Mar. 13, 2018.
Shapiro-Ilan et al. "Entomopathogenic Nematode Production and Application Technology", Journal of Nematology 44(2) :206-217,2012.
Williams et al. "Foliar Application of the Entomopathogenic Nematode Steinernema feltiae Against Leafminers on Vegetables", Biocontrol Science and Technology, 10(200-Issue1): 61-70, Jun. 28, 2010.
Wraight et al. "Efficacy of Spray Applications of Entomopathogenic Fungi Against Western Flower Thrips Infesting Greenhouse Impatiens Under Variable Moisture Conditions", Biological Control, 97: 31-47, Jun. 2016.
Canadian Office Action issued in Canadian Patent Application No. CA 3,149,337, mailed Jul. 2, 2025. 3 pages.
Elham, et al., "Occurrence of Entomopathogenic Fungus, Metarhizium anisopliae isolated from Island, BRIS and coastal soils of Terengganu, Malaysia", Journal of Sustainability Science and Management, vol. 13, No. 5, pp. 180-189, 2018.

* cited by examiner

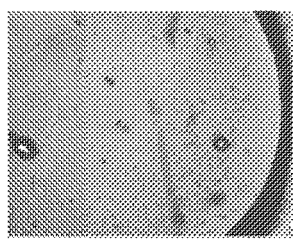 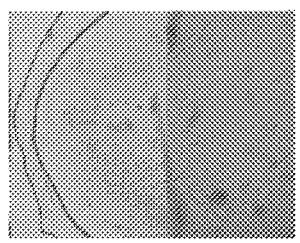 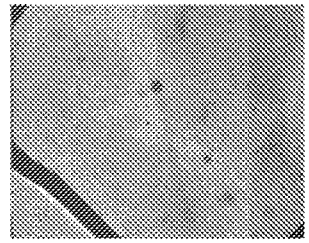
FIG. 7A    FIG. 7B    FIG. 7C
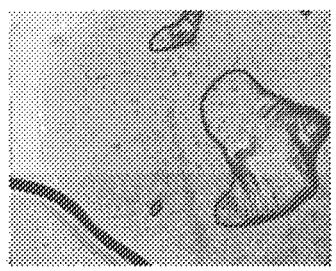 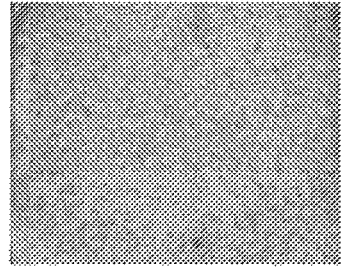
FIG. 7D    FIG. 7E Compound 4 Gum Arabic-6 h
(1/2 SDA)

Compound 8 Arabinogalactan-6 h
(1/2 SDA)

Compound 10 Polyacrylic sodium
salt-6 h (1/2 SDA)

Compound 11 Maltodextrose-6 h
(1/2 SDA)

Top-view     Side-view     SEM view

INSECT-PATHOGENIC FUNGUS, SPORES, COMPOSITION AND USE OF SAME

FIELD OF THE INVENTION

The present invention relates to compositions, particles and uses thereof, methods for controlling pests and methods of producing compositions and particles for the control of insect pests. In particular, the invention relates to an insect-pathogenic (entomopathogenic) fungus, compositions and particles comprising insect-pathogenic fungus (or fungal spores—conidia), their uses on plant material, methods for controlling pests with insect-pathogenic fungus, and processes for producing particles and particles, for use in controlling pests, employing such organisms.

STATEMENT OF BIOLOGICAL DEPOSITS

Strains of insect killing fungus of the group, green muscardine, named *Metarhizium anisopliae* var. *anisopliae*, are provided as BNL 101 deposited in the Centre for Agriculture and Biosciences International (CABI) UK Centre at Bakeham Lane, Egham, Surrey, TW20 9TY, United Kingdom, on 1 May 2018 having IMI CC Number 506833 and BNL 102 deposited in the Centre for Agriculture and Biosciences International UK Centre at Bakeham Lane, Egham, Surrey, TW20 9TY, United Kingdom, on 1 May 2018 having IMI CC Number 506834.

BACKGROUND TO THE INVENTION

A major problem in agriculture is continued crop losses caused by pest attacks. Western flower thrip (WFT), *Frankliniella occidentalis*, black vine weevil, (BVW) *Otiorhynchus sulcatus*, whitefly, red spider mites, leaf miner, large pine weevil, caterpillars etc., are the largest cause of associated economic losses internationally. For example, in Europe the combined loss from virus transmission and direct feeding damage by WFT is estimated to be £550 million per year. Global WFT damage exceeds £6.0 billion per year and no individually effective control measures exist. BVW alone causes annual losses of £40 million to UK, and over £4.0 billion worldwide to the horticultural and agricultural industry.

Currently farmers, growers and greenkeepers use combinations of techniques to achieve adequate insect pest control. However, these are unreliable, inadequate and crop losses are considerable. The removal of chemical insecticides such as neonicotinoids and organophosphates from the EU market in 2016 has exacerbated the problem. Insect pests are adept at developing resistance to chemicals and the use of commercially available biocontrol predators against WFT and BVW is unreliable due to difficulties of timing and inefficient predation. The problem is having a major impact on agriculture in the UK, continental Europe and worldwide.

In the UK 36,000 tons of strawberries (=£325 m in value, HDC report 2015) were successfully produced in 2015. However, when control of WFT was unsuccessful, total crop losses were seen in previous years. A more robust control program is thus essential to avoid up to £45 million losses per year. The value of the UK hardy nursery stocks industry is estimated at £796 million per year. Crop damage and crop rejections due to the presence of, for instance, BVW larvae can cause up to 100% losses if control measures are inadequate.

Currently, there is increasing consumer-led demand for growers to reduce the use of chemical pesticides in crop production and to grow fruit and vegetables with reduced detectable residues. There is also a decline in conventional chemical pesticide effectiveness due to pesticide resistance and increased regulation contained in European Regulation (EC) 1107/2009.

Natural microorganisms, including insect-pathogenic fungi, *Metarhizium, beauveria* and *isaria* species, have been commercialised for the control a range of insect pests. However, their efficacy in the field is inconsistent due to variability observed between different strains of the microorganisms.

The insect-pathogenic fungus *Metarhizium* spp., *beauveria* spp., *lecanicillium* and *Isaria fumosorosea*, are a widespread, soil-borne pathogen. To date, a few strains of *Metarhizium anisopliae* var. *anisopliae* have been commercialized as a bioinsecticide for the control of various insect pests. *Metahizium anisopliae* can be mass produced using a diphasic production system where log-phase broth cultures are used to inoculate a relatively inexpensive solid-state fermentation (SSF), usually on rice or barley. However, different strains of the same insect-pathogenic fungus can have varying pathogenicity for a particular pest as well as respond differently to biotic and abiotic conditions. Therefore, the search for more aggressive strains of insect-pathogenic fungi continues.

It is therefore desirable to provide a natural pest control option comprising one or more desirable features such as a wide host range and consistent pathogenicity across a range of pests, high virulence, high spore yield in production and high stability in the field.

SUMMARY OF THE INVENTION

In accordance with a first aspect of the present invention, there is provided a strain of the insect-pathogenic fungus, *Metarhizium* var. *anisopliae* selected from:
BNL 101 deposited in the CABI UK Centre, United Kingdom, on 1 May 2018 having IMI CC Number 506833; BNL 102 deposited in the CABI UK Centre, United Kingdom, on 1 May 2018 having IMI CC Number 506834; or a culture having the identifying characteristics thereof.

The first aspect of the present invention relates to a new strain of insect killing fungus of the group, green muscardine, named *Metarhizium anisopliae* var. *anisopliae* selected from: BNL 101 deposited in the CABI UK Centre, United Kingdom, on 1 May 2018 having IMI CC Number 506833; or BNL 102 deposited in the CABI UK Centre, United Kingdom, on 1 May 2018 having IMI CC Number 506834. Compared with other known bioinsecticide products and strains, a granular biological produced with the present strain, BNL 102, are effective in achieving high rates of mortality in a wide variety of insect pests. The strain according to the first aspect may also achieve one or more of: high spore yield (2.5 times higher than existing bioinsecticide products—Met52); greater stability; longer-shelf life; and few to no off-target effects.

The fungus *Metarhizium anisopliae* strain BNL 102 has a wide host range, high virulence and high spore yield, has high stability and can be produced on substrates such as rice or formulated within a nanoparticle, nanoshell or microencapsulation composition. Granular formulations of strain BNL 102 have proven efficacy against inter alia WFT, whitefly, aphids, weevils, caterpillars, pine weevil etc. The applicant's research on BNL 102 formulated within various nanoparticle, microencapsulation and/or water-soluble biopolymer compositions has shown high spore adherence in WFT, and increased efficacy, longevity, and delivery of fungal spores to the target.

Preferably the strain is substantially biologically pure, which will be appreciated by the skilled reader as meaning that the strain is comprised mostly of *Metarhizium anisopliae* strain BNL 102 substantially without any biological contaminants, within a degree of error as is appreciably feasible using standard manufacturing practices and processes.

In accordance with a second aspect of the present invention, spores are provided, obtainable from the insect-pathogenic fungus, *Metarhizium* var. *anisopliae* selected from: BNL 101 deposited in the CABI UK Centre, United Kingdom, on 1 May 2018 having IMI CC Number 506833; or BNL 102 deposited in the CABI UK Centre, United Kingdom, on 1 May 2018 having IMI CC Number 506834; or a culture having the identifying characteristics thereof.

Preferably the spores comprise at least one selected from: conidia; blastospores. Preferably, the spores are substantially biologically pure. As discussed above, the term "substantially biologically pure" in the context of the present invention will be taken by the skilled person to mean a degree of purity that is practicable using currently available manufacturing practices and processes.

In accordance with a third aspect of the present invention, there is provided a composition comprising, an insecticidally effective amount of insect-pathogenic fungus or spores obtainable therefrom; and an agronomically acceptable carrier thereof, the carrier comprising at least one selected from: bioplastic; biopolymer; polyacrylic acid; silica; zinc oxide; titanium dioxide; sodium selenosulfate; silver; hydrogel; carboxymethyl cellulose; methoxyl pectin; metal ions; chitosan; humectant; cellulose acetate; xantham gum; gum arabic; sodium alginate; chitosan; pectin citrus; arabinogalactan; alpha-cyclodextrin; maltodextrose; cellulose.

Naturally, the skilled addressee will understand that, for the purposes of the present invention, 'insecticidally effective amount' refers to an amount which induces mortality, disrupts or impedes growth, interferes with metamorphosis or other morphogenic functions, effects sterilization, and/or interferes with reproduction of one or more target insects.

Preferably the composition comprises one selected from: a powder; a liquid.

In embodiments wherein, the composition comprises a powder, the powder can preferably be applied directly to crops and plants. In other embodiments, the powder can preferably be mixed with a liquid and preferably applied directly to soil or to crops as a solution, a dispersion, a suspension and/or a mixture. The composition can preferably be comprised within a spray which can preferably be a foliar spray. The composition of the present invention is preferably a contact bioinsecticide, and without wishing to be bound by theory, it is thought that subsequent control of an insect population is not solely dependent upon ingestion of the composition by insects within said population. It is thought that the composition is preferably arranged to attach to a host insect cuticle, preferably where it can penetrate the exoskeleton of the host insect and subsequently cause morbidity and/or mortality within the host insect, preferably without entering the wider environment.

Preferably the composition comprises one selected from: nanoparticles; nanoshells; nanocapsules; microparticles; microshells; microcapsules.

The informed addressee will appreciate that the term "nanoparticles" in the context of the present invention refers to particles between 1 and 100 nanometres (nm) in one dimension with a surrounding interfacial layer. Similarly, the informed reader will appreciate that "nanoshells" in the context of the present invention refers to a type of spherical nanoparticle consisting of a dielectric core which is covered by a thin metallic shell, and that "nanocapsules", refers to nanoscale (1 nm to 100 nm in one dimension) vesicular systems, often comprising a polymeric membrane which encapsulates an inner liquid core. The informed addressee will appreciate that the term "microparticles" in the context of the present invention refers to particles between 0.1 and 100 µm in size. The meaning of the terms "microshells" and "microcapsules" are inferable from the above descriptions of their "nano" equivalents.

Preferably, the hydrogel comprises sodium alginate. Preferably at least a portion of the composition is soluble in a solvent. More preferably the solvent is water. Preferably the metal ions comprise at least one selected from: copper ions; iron ions. Preferably the humectant comprises glycerol. Preferably, the insect-pathogenic fungus comprises the strain of the first aspect of the present invention. Still more preferably, the spores comprise the spores of the second aspect of the present invention.

The most preferable embodiment of the third aspect of the present invention comprises the strain of the first aspect, and/or the spores of the second aspect.

In accordance with a fourth aspect of the present invention, there is provided a use of a composition comprising a strain of the insect-pathogenic fungus, *Metarhizium* var. *anisopliae* selected from: BNL 101 deposited in the CABI UK Centre, United Kingdom, on 1 May 2018 having IMI CC Number 506833; or BNL 102 deposited in the CABI UK Centre, United Kingdom, on 1 May 2018 having IMI CC Number 506834; or a culture having the identifying characteristics thereof, or spores obtainable therefrom in controlling a population of insects.

Preferably the strain is in accordance with the first aspect of the present invention. Preferably the spores are in accordance with the second aspect of the present invention. Preferably the strain and/or spores are comprised within a composition in accordance with the third aspect of the present invention.

In accordance with a fifth aspect of the present invention, there is provided a method of controlling a population of insects, the method comprising the step of applying an insecticidally effective amount of a strain of the insect-pathogenic fungus, *Metarhizium* var. *anisopliae* selected from: BNL 101 deposited in the CABI UK Centre, United Kingdom, on 1 May 2018 having IMI CC Number 506833; or BNL 102 deposited in the CABI UK Centre, United Kingdom, on 1 May 2018 having IMI CC Number 506834; or a culture having the identifying characteristics thereof, to a locus of said population of insects.

Preferably the insecticidally effective amount of a strain of the insect-pathogenic fungus is comprised within a composition in accordance with the third aspect of the present invention.

In accordance with a sixth aspect of the present invention, there is provided a method of controlling a population of insects, the method comprising the step of applying an insecticidally effective amount of spores obtainable from the insect-pathogenic fungus, *Metarhizium* var. *anisopliae* selected from: BNL 101 deposited in the CABI UK Centre, United Kingdom, on 1 May 2018 having IMI CC Number 506833; or BNL 102 deposited in the CABI UK Centre, United Kingdom, on 1 May 2018 having IMI CC Number 506834; or a culture having the identifying characteristics thereof, to a locus of said population of insects.

Preferably the insecticidally effective amount of spores is comprised within a composition in accordance with the third aspect of the present invention.

The skilled addressee will understand that, for the purposes of the present invention, 'a population of insects' may refer to a mixed-species, geographically discreet population of insects, or single-species, geographically discreet population of insects. The term 'controlling a population of insects' is used herein to mean that the number of insects within a population of insects is reduced, principally through mortality, at a level that is significantly greater than a population to which the method of the present invention is not performed.

In the use of the fourth aspect, and the method of the fifth and sixth aspects of the present invention, the population of insects preferably comprises at least one selected from the range: WFT, weevils, aphids, whitefly, spider mites, caterpillars, chafers, ticks, midges and mosquitos.

In the use of the fourth aspect, and the method of the fifth and sixth aspects of the present invention, the population of insects preferably comprises at least one selected from the range: WFTs (*Frankliniella occidentalis*); Spider mite (*Tetranychus urticae*); Whiteflies (*aleyrodidae* spp); Aphids (*Myzus persicae*); Mosquitoes (*Aedes aegypti; Anopheles stephensi; Culex quinquefasciatus*); Ticks (*ixodes* spp); Armyworms (*Spodoptera littura*); European May beetle (*Melolontha melolontha*); June beetle (*Hoplia philanthus*); Leatherjackets (*Tipula paludosa*); Wireworm (*agriotes* spp); Biting midge (*culicoides* spp); Vine weevil (*Otiorhynchus sulcatus*); Pine weevil (*Hylobius abietis*).

Embodiments of the present invention will be appreciated comprising a strain which is a mixture of: BNL 101 deposited in the CABI UK Centre, United Kingdom, on 1 May 2018 having IMI CC Number 506833; and BNL 102 deposited in the CABI UK Centre, United Kingdom, on 1 May 2018 having IMI CC Number 506834, or a culture having the identifying characteristics thereof.

BRIEF DESCRIPTION OF THE FIGURES

Specific embodiments will now be described by way of example only, and with reference to the accompanying drawings.

FIG. 3A shows germination of BNL 102 in the presence of a selection of nanoparticle compositions, after 48 hours incubation at 25° C., in Sabouraud Dextrose Agar (SDA) modified to 0.95 $a_w$; M control; FIG. 3B: bioplastic; FIG. 3C: PAA; FIG. 3D: $SiO_2$; FIG. 3E: ZnO; FIG. 3F: $TiO_2$; FIG. 3G: NaSSS; FIG. 3H: Ag.

FIG. 5A: shows alginate samples with Fe(III); FIG. 5B: Fe(II); FIG. 5C: samples after 3 hours under lamp; and FIG. 5D: samples after 4 hours under natural light.

FIG. 6A: shows alginate/BNL 102/Cu at 0.93 $a_w$ after 48 hours; FIG. 6B: after 72 hours; FIG. 6C: alginate/BNL 102/Cu/chitosan at 0.93 $a_w$ after 48 hours; FIG. 6D: after 72 hours; FIG. 6E: alginate/BNL 102/Cu at 0.95 $a_w$ after 48 hours; FIG. 6F: after 72 hours; FIG. 6G: alginate/BNL 102/Cu/chitosan at 0.95 $a_w$ after 48 hours; FIG. 6H: after 72 hours; and FIG. 6I alginate/BNL 102/Cu/chitosan in SDA after 48 hours.

FIG. 7A-FIG. 7E: FIG. 7A shows alginate/BNL 102/Fe (III) on 0.93 $a_w$ after 24 hours; FIG. 7B: after 48 hours; FIG. 7C: alginate/BNL 102/Fe(III) on 0.95 $a_w$; FIG. 7D: after 48 hours; alginate/BNL 102/Fe(III) on SDA D: after 24 hours; and FIG. 7E: after 48 hours.

FIG. 8A shows alginate/BNL 102/Fe (III)/chitosan/glycerol at 0.93 $a_w$ after 24 hours; FIG. 8B: 0.95 $a_w$ after 24 hours; and FIG. 8C: SDA after 24 hours;

FIG. 9C: alginate/BNL 102/Fe(II)

FIG. 19A-FIG. 19D: FIG. 19A: Germination, Compound 4 Gum Arabic-6h (½ SDA); FIG. 19B: Germination Arabinugalactan-6h (½ SDA); FIG. 19C: Germinator, Compound 10 Polyacrylic Sodium salt-6 hr. (½ SDA); FIG. 19D: Germinator, Compound 11 maltodextrose-6h (½ SDA).

FIG. 27A: Healthy WFT; FIG. 27B: An adult WFT cadaver 5 days after death showing sporulation of *M. anisopliae* BNL 102; FIG. 27C: close-up picture of fungal spores produced on dead cadaver.

FIG. 29A: shows a bioassay procedure. Protocol used to contaminate adult WFT with conida and blastospores-formulation of entomopathogenic fungi, *Metarhizium anisopliae* strain BNL 102. Experimental vessels were white opaque plastic containers (25×25 cm; 15 cm in depth; surface area 625 $cm_2$) with a ventilation hole (10×10 cm) cut into the lids and covered with nylon gauze (64 mm pore size); FIG. 29B: A double layer of tissue paper (36.5 cm length; 25 cm width; surface area 917.5 $cm_2$) was placed in each container so that it covered the bottom and halfway up each side. This tissue paper was then moistened using a hand-held sprayer; FIG. 29C: Fresh beans and flowers were placed on the bottom before spraying of both formulation; FIG. 29D: Conidia and blastospore formulations were uniformly sprayed using a hand-held sprayer (pore size 300 μm); FIG. 29E: Approximately 400 adult male and female WFT were released into the containers and WFT survival monitored daily for 3 days.

DETAILED DESCRIPTION

Figure 1:
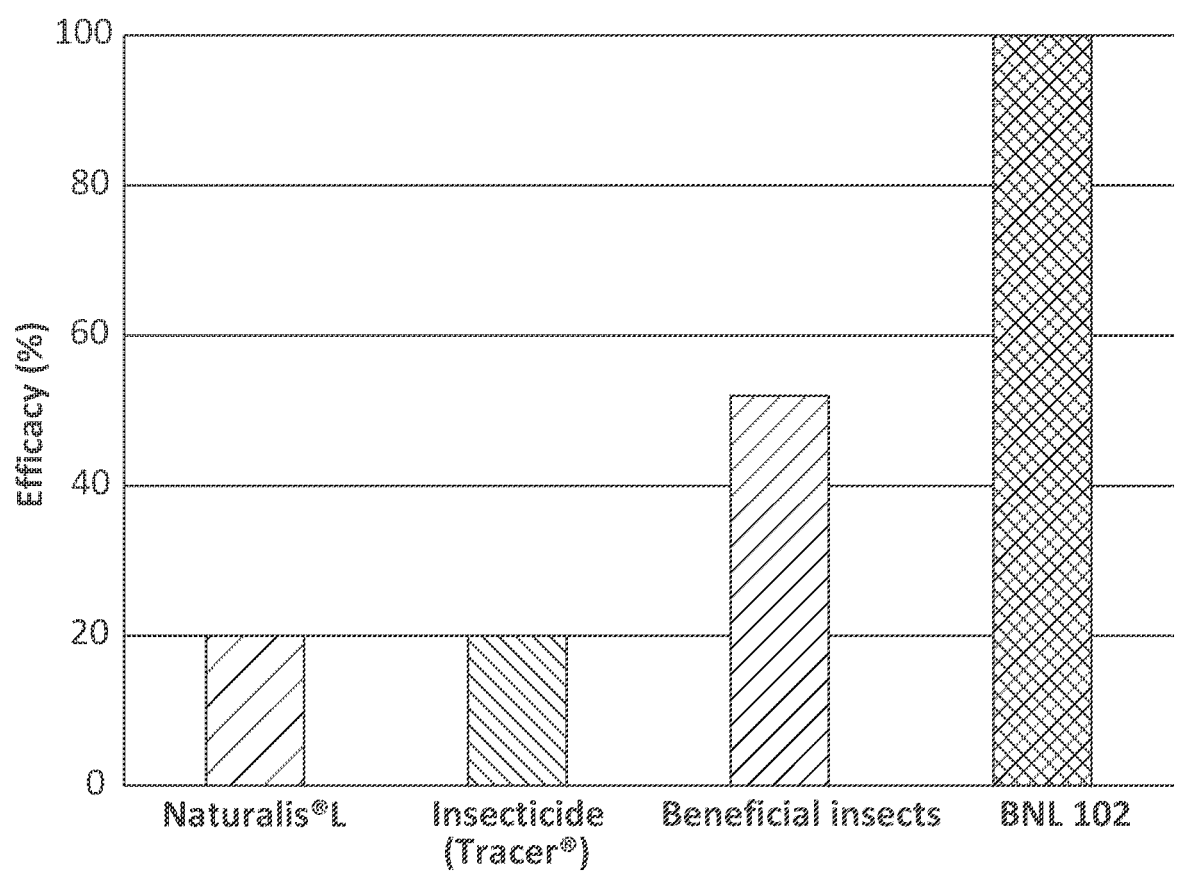
FIG. 1 shows efficacy of the BNL 102 unformulated fungus against WFT in semi-field conditions compared with currently marketed alternatives in the form of a commonly employed bioinsecticide (Naturalis®L); a commonly used small molecule insecticide (Tracer®); and beneficial insects (predatory).

Referring to FIG. 1, the data demonstrates an up to 90% mortality rate when the BNL 102 was used against WFT (insect), and additional trials conducted have demonstrated up to 100% efficacy against a wide range of insect species including WFT, aphids, army worms, vine weevil and pine weevil (which showed between 80-100% efficacy in greenhouse trials). The data showed that BNL 102, without a nanoparticle composition, was two times and three times more effective in controlling a population of WFT over other products that do not include BNL 102. These other products do not include BNL 102.

As shown in FIG. 1, the data shows that BNL 102 provided 100% control of WFT compared to results from other products that do not include BNL 102. Results using these other products demonstrated the following results: a 50% for beneficial insects, 20% for insecticides and 20% for bioinsecticides. As a significantly more effective component in a pest management program, BNL 102 containing and/or based products will provide many advantages, including to assist the grower community to comply with EU Integrated Pest Management regulations, reduce the use of chemical pesticides, improve crop yield and/or increase the users' profits.

The strain of insect-pathogenic fungus of the first aspect of the present invention, and the associated spores in accordance with the second aspect of the present invention, are shown to provide an improvement in pest control by a factor of 2 to 4 times over currently available solutions as can be seen in FIG. 1. A major problem with chemical insecticides involves development of resistance to active compounds. Since the present invention does not comprise a small molecule pesticide having an active compound to which a pest can develop a resistance, the present solution may overcome a significant limitation of current chemical insecticides. The present invention may provide a significant increase in crop yields while preferably remaining a relatively cheap alternative to chemical insecticides when considering efficacy (see Table 1), and therefore potentially minimizing economic burden upon crop producers.

TABLE 1

Cost comparison of treating WFT with *Metarhizium* anisoplae BNL102 and otherbiological and insecticides products.

|  | BNL102 | Met52® OD | Naturalis® L | Predators/Parasitoids | Chemicals |
|---|---|---|---|---|---|
| Approximate cost (£) | 1,200 | 1,200 | 1,160 | 700 | 700 |
| Efficacy (%) | 90-100 | 40 | 20 | 40-50 | 20 |

As can be seen in Table 2 below, the first and second aspects of the present invention display a wide host range, and thus provide for a potential reduction in the food waste, which might be caused by direct damage attributed to a wide range of insect pests.

TABLE 2

Pathogenicity of *Metarhizium* anisoplae BNL 102 against multiple pests in laboratory conditions.

| Insect Species | Scientific Name | Mortality (%) |
|---|---|---|
| Western flower thrip | *Frankliniella occidentalis* | 100 |
| Spider mite | *Tetranychus urticae* | 60-70 |
| Whitefly | *Aleyrodidae* | 60-75 |
| Aphid | *Myzus persicae* | 90-100 |
| Mosquito | *Aedes aegypti* | 100 |
| Mosquito | *Anopheles stephensi* | 100 |
| Mosquito | *Culex quinquefasciatus* | 100 |

TABLE 2-continued

Pathogenicity of *Metarhizium* anisoplae BNL 102
against multiple pests in laboratory conditions.

| Insect Species | Scientific Name | Mortality (%) |
|---|---|---|
| Tick | *Ixodes* spp | 90-100 |
| Armyworm | *Spodoptera littura* | 100 |
| European May beetle | *Melolontha melolontha* | 40-50 |
| June beetle | *Hoplia philanthus* | 30-50 |
| Leather jacket | *Tipula paludosa* | 30-50 |
| Wireworm | *Agriotes* spp | 30-50 |
| Biting midge | *Culicoides* spp | 100 |
| Vine weevil | *Otiorhynchus sulcatus* | 100 |
| Pine weevil | *Hylobius abietis* | 100 |

The present invention may provide easy compliance with EU legislation when used within an Integrated Pest Management programme, is preferably non-toxic to workers and/or users and/or consumers and/or safe on the environment, may be residue free, and may be suitable for traditional and/or organic farming. The present invention is preferably compatible with other biopesticides, bio-fungicides, and/or pesticides, for integration into a larger, or already establish Integrated Pest Management program. The present invention may also be easy to use in different cropping systems.

Semi-field trials have demonstrated up to 90-100% mortality rate against WFT (FIG. 1) and additional studies conducted against other pests are mentioned in Table 2. This data suggested that *M. anisoplae* BNL 102 is a wide host range technology and may be used against many pests and may therefore be a potential candidate for commercialisation. *M. anisoplae* BNL 102 without a nanoformulation/composition is 2 times, 3 times, or more than 2-3 times more effective in controlling the WFT over known products in the market. For example, BNL 102 provided 100% control of WFT compared to other products, these other products providing 52% for beneficial insects, 20% for insecticides (Tracer®) and 20% for bioinsecticide (Naturalis-L). *M. anisoplae* BNL 102 encapsulated formulation will have significant impact under field condition when environmental conditions are different from lab or semi-field. As a significantly more effective component in Integrated Pest Management (IPM) programmes, *M. anisoplae* BNL 102 based products may help the African growers comply with EU IPM regulations, reduce use of chemical pesticides, improve crop yield and/or potentially increase users' profits.

The following Examples 1 to 5 were carried out as part of a single study and congruent techniques, protocols and materials were used throughout unless otherwise stated.

Example 1

Culture Media Preparation

Sabouraud Dextrose Agar (SDA) culture media was prepared in distilled water following a standard procedure. The media was autoclaved at 121° C. for 15 minutes, then cooled to 50° C. before plating in petri dishes for further use. Aseptic technique was followed. The petri dishes were stored at 4° C. until needed in further work.

SDA 0.93 (93% equilibrium relative humidity (ERH))/SDA 0.95 ((95% equilibrium relative humidity (ERH)): 92 g/75 g glycerol was added to 250 mL/300 mL distilled water. 19.5 g SDA powder was then added to the glycerol solutions and the mixtures were manually shaken. Media was then autoclaved at 121° C. for 15 minutes and cooled to 50° C. before plating in petri dishes, using aseptic technique, and stored at 4° C.

Conidia of *M. anisopliae* strain BNL 102 were grown on the SDA culture media using standard protocol.

Preparation of 1 wt % Nanoparticle Compositions (Dispersions) and BNL 102 Suspension 1 wt % nanoparticle dispersions were prepared in tween/distilled water for the following seven types of nanoparticles: bioplastic, PAA, Si, ZnO, $TiO_2$, NaSSS and Ag. Dispersions were shaken prior to application to ensure even distribution.

A *M. anisoplae* BNL 102 suspension was prepared by taking spores from the petri dish in tween/water, and vortexed for 2 minutes. Fungal spores were counted using a haemocytometer. A suspension was prepared having $2 \times 10^6$ spores/mL, the suspension being prepared from a stock BNL 102 suspension.

Water Activity Measurement of the Prepared 1 wt % Nanoparticle Dispersions

Water activity ($a_w$) of each of these samples as a function of time was measured after 1 hour, 3 hours and 6 hours. Aqua Lab Dew Point 4TE water activity measurement instrument was used.

Figure 2:
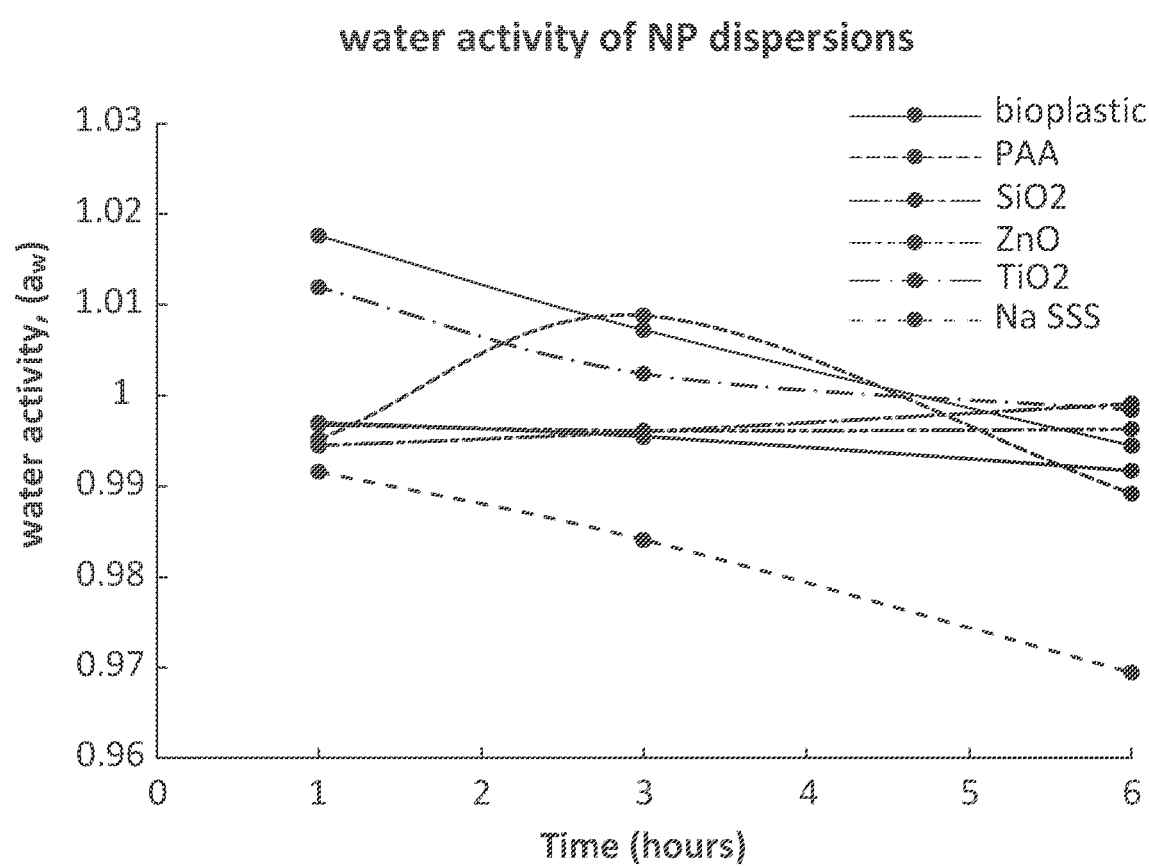
FIG. 2 shows water activity ($a_w$) of various nanoparticle compositions as a function of time.
Figure 3A:
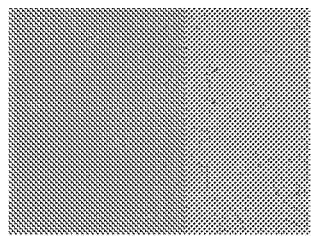
FIG. 3A-FIG. 3H.
Figure 3B:
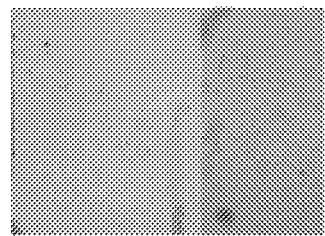
Figure 3C:
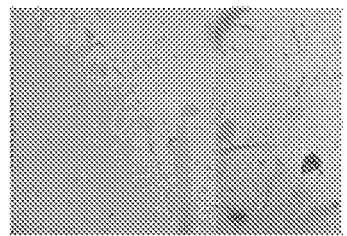
Figure 3D:
Figure 3E:
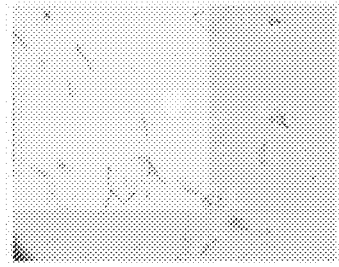
Figure 3F:
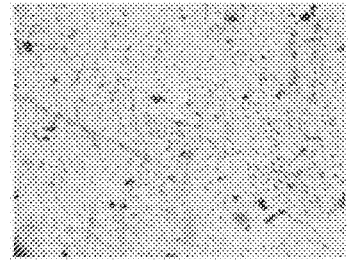
Figure 3G:
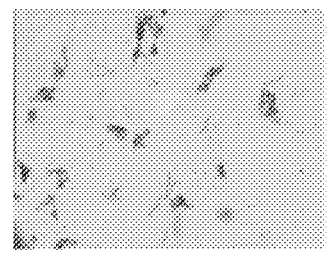
Figure 3H:
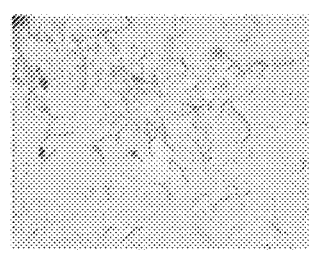

The results for water activity ($a_w$) as a function of time for various types of nanoparticle dispersions is presented in Table 1 and FIG. 2. As can be seen, a mild water activity change is observed for Na SSS and PAA. The samples did not show a significant change in water activity over time, suggesting stability of the *M. anisoplae* BNL 102 spore preparation on each of the nanoparticle compositions.

TABLE 3

Water activity of a selection of nanoparticle compositions after 1, 3 and 6 hours.

| Time (hours) | Bioplastic | PAA | $SiO_2$ | ZnO | $TiO_2$ | Na SSS | Ag |
|---|---|---|---|---|---|---|---|
| 1 | 0.997 | 0.9952 | 0.9945 | 0.9968 | 1.0119 | 0.9916 | 1.0176 |
| 3 | 0.9955 | 1.0088 | 0.996 | 0.9961 | 1.0024 | 0.9841 | 1.0072 |
| 6 | 0.9917 | 0.9892 | 0.9991 | 0.9963 | 0.9984 | 0.9694 | 0.9945 |

Example 2—Compatibility of Nanoparticles with the Bnl 102 Spores 0.5% chitosan was prepared, and 1 mL was added to 9 mL of each of the nanoparticle dispersions prepared as described in Example 1.

0.2 mL of each chitosan/nanoparticle dispersion and 0.2 mL of BNL 102 suspension prepared ($2 \times 10^6$ spores/mL) were plated in a petri dish with 0.93 and 0.95 SDA media prepared as described in Example 1. Duplicates of each of the seven chitosan/nanoparticle dispersions were made for each of 93% and 95% ERH SDA media. Control petri dishes were also prepared by adding 0.4 mL of BNL 102 suspension to plates comprising each of 0.93 and 0.95 SDA media. The plates were incubated for at least 24 hours at 25° C. Altogether, 32 plates were incubated; 16 for 93% and 16 for 95% ERH SDA media. Aseptic technique was used.

The germination of the fungal spores was observed using an optical microscope to check the compatibility of nanoparticles on the spores. An Olympus B×40 optical microscope with attached Infinity3 Lumenera camera and INFINITY ANALYZE software was employed to capture images of the spores.

Preparation of Stock Solutions Needed for Composition 1.5 wt % sodium alginate (herein referred to as "alginate"), 1 wt % CuSO4 (herein referred to as "Cu"), 1 wt % FeCl3, 1 wt % $FeCl_2$, 0.5 wt % chitosan, 0.5 wt % glycerol and *M. anisoplae* BNL 102 suspension (concentration not known, random amount taken, until water appeared to have greenish tinge) were all prepared in tween/distilled water in separate vials. The solutions were vortexed or manually shaken to get clear solution of the samples.

FIG. 3 shows the images captured to indicate the germination of spores in presence of nanoparticles, after 48 hours at 0.95 water activity. As observed, most of the nanoparticles show good compatibility with the BNL 102 spores and do not inhibit germination.

Example 3—Preparation of Alginate/Cu/Bnl 102/Chitosan Capsules

Alginate/Cu capsules: sodium alginate was added dropwise to the 1 wt % CuSO4 solution in 1:1 ratio, and shaken. Light blue capsules were formed.

Alginate/Cu/chitosan capsules: The Alginate/Cu capsules were mixed with equal volume of the 0.5 wt % chitosan solution to coat with chitosan.

Alginate/Cu/BNL 102 capsules: First Alginate/BNL 102 suspension was prepared by adding alginate to BNL 102 suspension in 1:4 volume ratio. The mixture was shaken manually. Then alginate/BNL 102 was added to the solution of CuSO4 in 1:1 ratio and mixed.

Alginate/Cu/BNL 102 chitosan capsules: The capsules prepared above were mixed with equal amount of the 0.5 wt % chitosan solution to coat with chitosan.

Effect of Alginate/Cu and Alginate/Cu/Chitosan on Germination of BNL 102 Spores

Two types of capsules, i.e. alginate/BNL 102/Cu and alginate/BNL 102/Cu/chitosan, were plated on separate petri dishes containing SDA, 0.93 and 0.95. Five capsules were put on the media in the plate at five different spots. Two plates for each type of media were prepared. Aseptic technique was followed during this work. The plates were incubated at 25° C. for at least 24 hours. The germination was checked after 24, 48 and up to 72 hours after plating.

Figure 4:
FIG. 4 shows photographs of alginate/Cu capsules comprising BNL 102.

The visual appearance of alginate samples encapsulating Cu, BNL 102/Cu and those coated with chitosan is shown in FIG. 4. Alginate/Cu capsules are light blue in color.

Example 4—Preparation of Alginate/Fe(II) and Alginate/Fe(IIi) Samples (Fe Capsules)

15 1:1 volume ratio of sodium alginate and FeCl3 (Fe(II)) or $FeCl_2$ (Fe(III)) was used. The procedure followed was similar to that for Cu in Example 3. In the case of Fe(II) and Fe(III), the container FeCl3 or $FeCl_2$ solution was covered with foil to minimize the effect of light on the FeCl3 and $FeCl_2$.

The effect of light on the Fe capsules and viscous liquid was studied by testing samples in containers (open) under both a lamp and natural light for up to 4 hours.

Preparation of Alginate/BNL 102/Fe(III) and Alginate/BNL 102/Fe(II)

Firstly, alginate/BNL 102 suspension was prepared by following the procedure as described in Example 3. 1:4 volume ratio of BNL *M. anisoplae* 102:alginate was used, and alginate was added to the BNL 102 suspension. The pH of the solution was adjusted to 7, by addition of small amount of 0.1 M NaOH.

Alginate/BNL 102/Fe(III) or Fe(II) samples were prepared following the method described above. Alginate/BNL 102 was added dropwise using a needle syringe to the Fe(III) or Fe(II) solutions taken in two different containers, which were each covered with aluminum foil.

Effect of Alginate/BNL 102/Fe(III) and Alginate/BNL 102/Fe(II) on Germination of BNL 102 Spores Two samples, i.e. alginate/BNL 102/Fe(III) and alginate/BNL 102/Fe(II), were plated on separate petri dishes containing SDA, 0.93 and 0.95. Five capsules/drops were placed onto the media in the plate at five different spots. Two plates for each type of media were prepared. Aseptic technique was used throughout. The plates were incubated at 25° C. for at least 24 hours. The germination was checked after 24, 48 and up to 72 hours after plating.

Figure 5A:
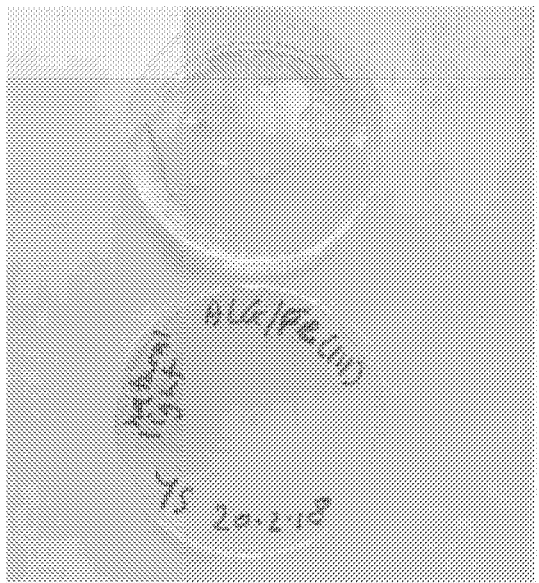
FIG. 5A-FIG. 5D.
Figure 5B:
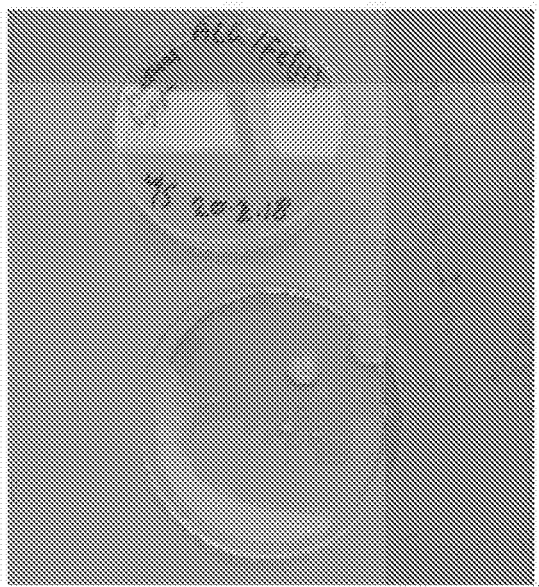
Figure 5C:
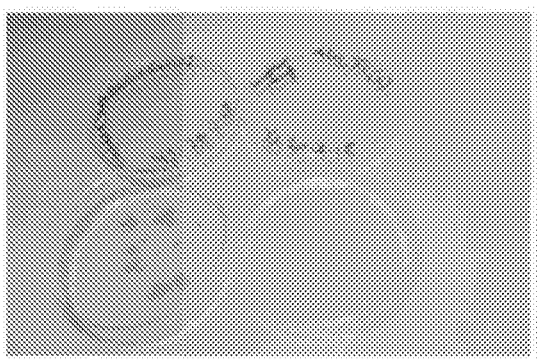
Figure 5D:
Figure 6A:
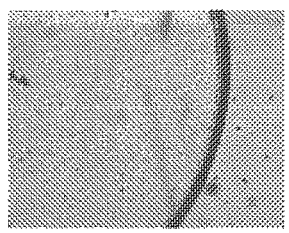
FIG. 6A-FIG. 6I.
Figure 6B:
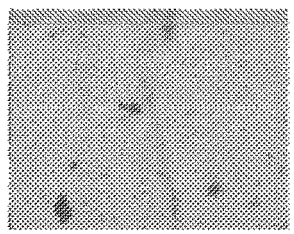
Figure 6C:
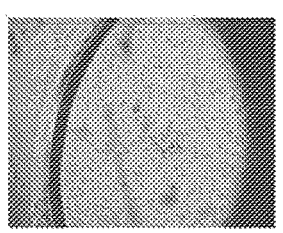
Figure 6D:
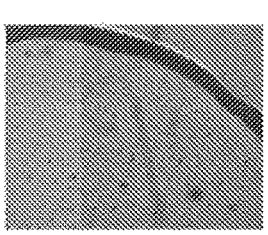
Figure 6E:
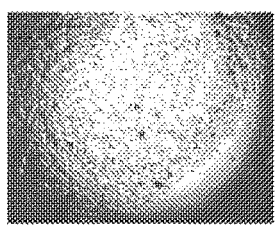
Figure 6F:
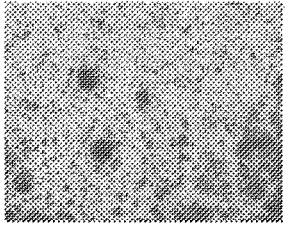
Figure 6G:
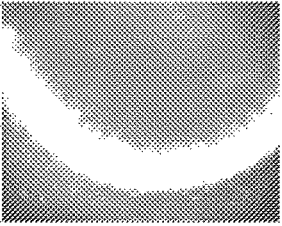
Figure 6H:
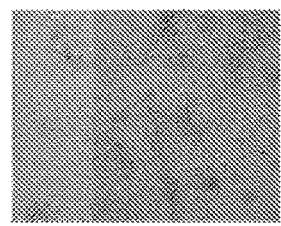
Figure 6I:
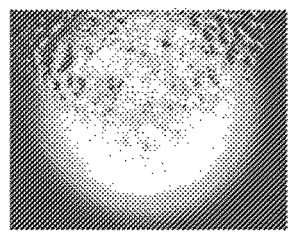
Figure 8A:
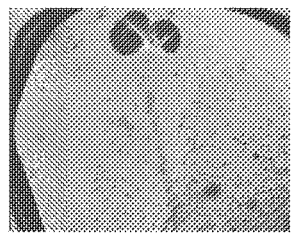
FIG. 8A-FIG. 8C.
Figure 8B:
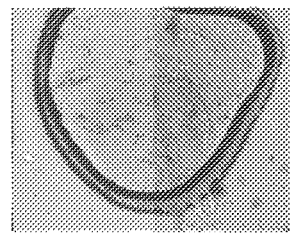
Figure 8C:
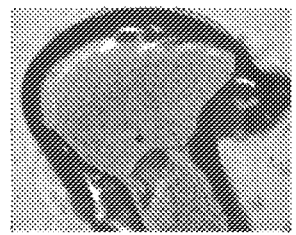
Figure 9A:
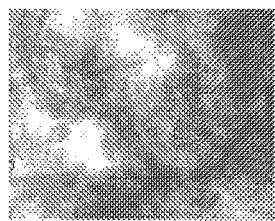
FIG. 9A-FIG. 9D.
Figure 9B:
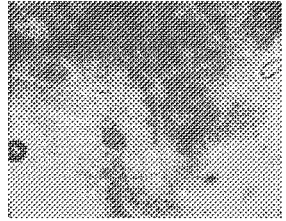
Figure 9C:
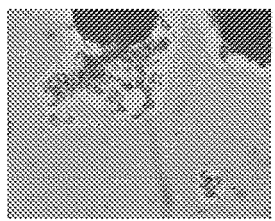
Figure 9D:
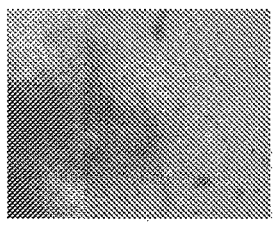

FeCl3 formed brownish capsules whereas $FeCl_2$ formed viscous white liquid when mixed with alginate (FIG. 5A; and FIG. 5B). The capsules and the viscous liquid lost water and some change in colour was also observed (FIG. 5C; and FIG. 5D), e.g. brown the capsules of alginate/Fe(III) turned darker and shrank in size. The white viscous liquid became more solid. Moreover, the water activity of alginate/BNL 102/Fe(III)/chitosan/glycerol showed a significant decrease in water activity value from 0.9984 to 0.2748 within 4 hours.

Example 5-Preparation of Alginate/Bnl 102/Fe(III)/Chitosan/Glycerol

First 1:1 chitosan: glycerol mixture was prepared. Then the alginate/BNL 102/Fe(III) capsules prepared as previously described in Example 4, and were coated using chitosan/glycerol using 1:1 weight ratio of alginate/BNL 102/Fe(III):chitosan/glycerol.

Water Activity and Germination Effect of Alginate/BNL 102/Fe (III)/Chitosan/Glycerol Both the water activity was measured and germination was studied, as a function of time. FIG. 6 to FIG. 9 show optical microscope images for alginate/BNL 102 formulations with Cu, Fe(III) and Fe(II) ions with and without coating of chitosan or chitosan/glycerol. As can be seen, the alginate, metal ions, chitosan or glycerol do not have any inhibitory effect on germination of fungi spores.

The nanoparticle compositions made using alginate (a hydrogel) showed desirable properties which would be expected to enhance adhesion of fungal spores on plants and insect pests, for example, when used in spray applications. The presently presented example embodiments of compositions of nanoparticle compositions according to the third aspect of the present invention have been demonstrated with a strain of insect-pathogenic fungus according to the first aspect of the present invention, and spores therefrom according to the second aspect of the present invention, newly identified as having favorable host-range, virulence and efficacy characteristics over currently available alternatives. The combination of the fungus or spores according to the first and second aspects, along with the composition according to the third aspect, could in turn provide an improved efficacy over currently available alternatives. Moreover, the addition of metal ions such as copper and iron has been shown herein to have no negative effect and does not inhibit spore germination. The efficacy of the composition can further be improved by chitosan coating and the humidity of the composition could be controlled by addition of humectants such as glycerol.

Microencapsulation of fungal spores may also be used to form an additional example embodiment of a composition of the third aspect of the present invention. Insect-pathogenic fungal spores harvested from solid-state fermentation would preferably be stored at 40° C.

Water-soluble biopolymers would preferably be dissolved in water to form an aqueous solution. The candidates of such biopolymers, might include, for example, a mixture of carboxymethyl cellulose (CMC) and sodium alginate (SA) or low methoxyl pectin. Additional examples of candidates for biopolymers would be appreciated by the skilled reader. The fungal spores are preferably added to the solution to form a suspension. The aqueous suspension would then be dispersed in an oil phase (in, for example, vegetable oil) to form a water/oil emulsion. Additional examples of oils suitable for producing a water/oil emulsion will be appreciated. The emulsion is ideally produced in a stirred tank with a Rushton turbine of standard configuration. Other methods of producing an emulsion will be apparent. The maximum droplet size of the aqueous phase, with fungal spores, will ideally be controlled to be less than 100 microns by varying agitation speed of the impeller of the Rushton turbine. In the presently described example, calcium chloride ($CaCl_2$) powders would then be added into the oil phase, and the mixing of the emulsion would be maintained. When $CaCl_2$ powders come into contact with the aqueous phase, $Ca_2+$ will be released at the water/oil interface to exchange with sodium ions (Na+) in the aqueous solution, to form a solid shell of calcium alginate when sodium alginate is present, or to result in gelation from specific non-covalent ionic interactions between blocks of galacturonic acid residues of the pectin backbone with $Ca_2+$. In each case, the fungal spores mixed with carboxymethyl cellulose can be encapsulated. The formed microcapsules will be centrifuged from the oil, and air or freeze dried for maintaining long-term storage stability. The water activity of the dried microcapsules should ideally be maintained at 0.1-0.3.

Relating to an example method of use of the above-described example composition, the resulting microcapsules would be used to form a foliar spray. Before the microcapsules are sprayed onto plants and crops, they will be dispersed in water with a biosurfactant of high hydrophile-lipophile balance (HLB) value such as rhamnolipids, sophorolipids or saphorose lipid from microbial origin. The dry hydrogel microcapsules should have super water-absorbing capability and swell to a significant extent after being exposed to water. The biosurfactant can significantly reduce the interfacial tension of the aqueous suspension. After the microcapsules in water are sprayed to the surface of plants, the biosurfactant should reduce the droplet size formed, and help the aqueous suspension to spread well on the surface to enhance the retention of the microcapsules. Moreover, the water absorbed in the microcapsules should be maintained for up to 5 hours, which allows the fungal spores to germinate. The mechanical strength of the microcapsules should be tuned to allow the microcapsules to rupture after 5 hours due to hydration and swelling or ruptured by insects when they move on the microcapsules, which permits direct contact between the insects and the fungal spores to realize the functionalities of the insecticide.

The following Examples 6 to 9 were carried out as part of a second study and congruent techniques, protocols and materials were used throughout unless otherwise stated.

Example 6—Inoculum Production

*M. anisoplae* BNL 102 conidia were obtained from culture of the strains grown on Saubaroud Dextrose Agar (SDA) at 25° C. for 10 days.

For blastopore production we used the equivalent of 10 g peptone and 40 g glucose broth medium. This was either as 50 mL aliquots in 250 mL baffled flasks or 100-125 mL in 500 mL baffled flasks on an orbital shaker at 125 rpm and incubated for 72 h. Before use, conidia were placed in a 25 mL Universal glass bottle containing 10 mL of sterile water and 0.01% between 80 using a sterile loop from the above cultures and shaken vigorously. For liquid broth cultures 25 mL of medium was filtered through sterile glass wool to remove mycelium and fragments to produce a broth containing only blastospores.

The concentrations of the conidia and blastospores were checked using a haemocytometer and diluted where necessary to obtain $1\times10^4$ and $10^6$ cfu/mL.

Compatibility of *Metarhizium anisopliae* BNL 102 Conidia and Blastospores
1. CMC (Insoluble)
2. Cellulose acetate (insoluble mixture)
3. Xantham Gum (Insoluble)
4. Gum Arabic (soluble)
5. Na Alginate (Insoluble)
6. Chitosan (soluble/Gel)
7. Pectin Citrus (Insoluble)
8. (+) Arabinogalactan (soluble)
9. Alpha-Cyclodextrin (soluble)
10. Poly (acrylic acid sodium salt) (soluble)
11. Maltodextrose (soluble)
12. Cellulose (insoluble mixture)

In all cases a 12.5% mixture was made of all the compounds in sterile water and tween 80. This was then diluted to make up 1.25% of each compound. This was used for the compatibility assays. Seven compounds were soluble in the sterile water. The others formed very stiff gels which made them difficult to work with and were thus not included in the assays.

Germination Assay

A 0.1 mL aliquot of either conidial or blastospore suspension was added to the treatments. These were shaken and left for 60 mins. Then, 0.2 mL aliquots were spread onto 2 replicate plates of ½ strength SDA (0.995 $a_w$=99.5% ERH) and onto 2 replicate plates of ½ strength SDA modified to 0.95 $a_w$, (=95% ERH) with glycerol. The spore suspensions and compounds were spread using a sterile stainless-steel spreader. The different water activity ($a_w$) treatments (SDA plates) were stored in polyethylene bags which were sealed to ensure that the conditions were maintained and incubated at 25° C. for up to 48 h. The treatments and replicates were checked after 24 and 48 h.

To check germination, a 1 cm stainless steel cork borer was used to cut at random discs from the replicate SDA plates. Two from each replicate were taken at random placed on a glass slide, stained with lactophenol/cotton blue to arrest the germination and growth. Glass coverslips were then placed over the discs for microscopic examination. Photographs were made of the different treatments in random fields and stored on the lab PC. The percentage germination was evaluated. Where all conidia/blastospores had germinated the germ tube lengths were measured of up to 20-25 propagules at random. The means and S.E. (standard error) for the different treatments were calculated and plotted.

Figure 10:
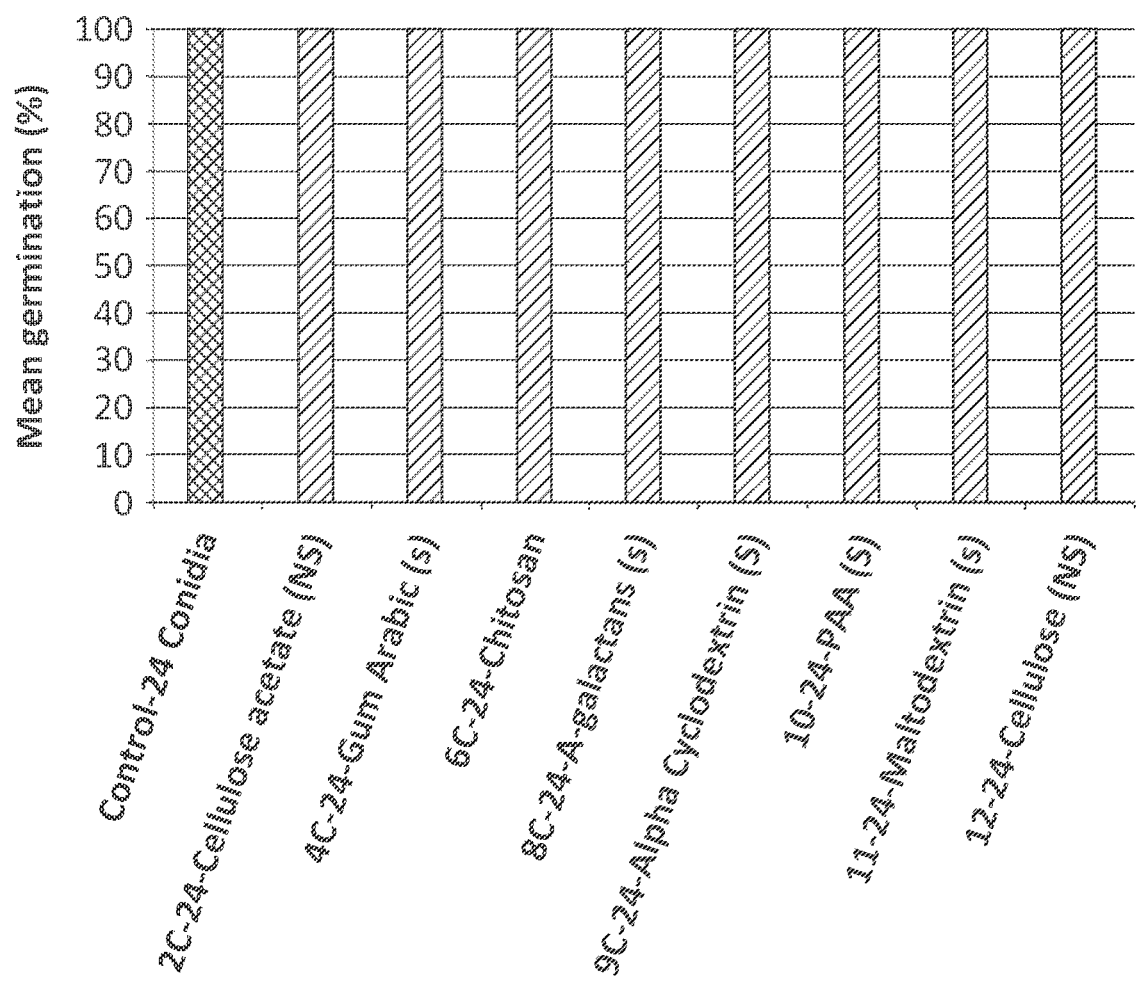
FIG. 10 shows germination of conidia at 25° C.; 24 h (0.0995$a_w$=99.5% RH) on ½ Sabouraud Dextrose Agar.

FIG. 10 shows that conidial treatments were completely compatible with all the compounds tested with germination in all cases after 24 h with freely available water. However, there were differences in germ tube lengths (FIG. 10).

In the untreated control germ tube length was very long and not measureable. With the different compounds the germ tube lengths were significantly shorter and there were some differences between treatments.

Figure 11:
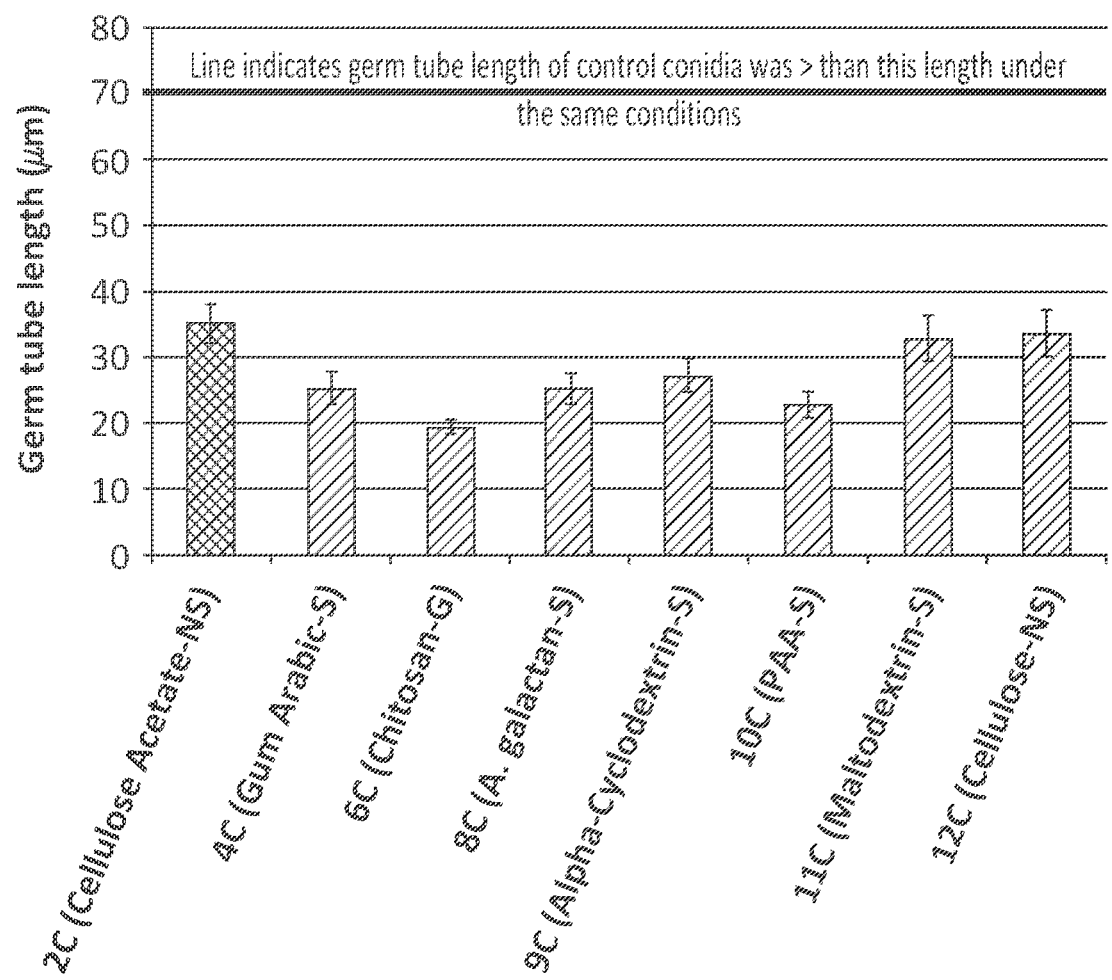
FIG. 11 shows germ tube extension of germinating conidia at 25° C.; 24 h (0.0995$a_w$=99.5% RH) on ½ Sabouraud Dextrose Agar.
Figure 12:
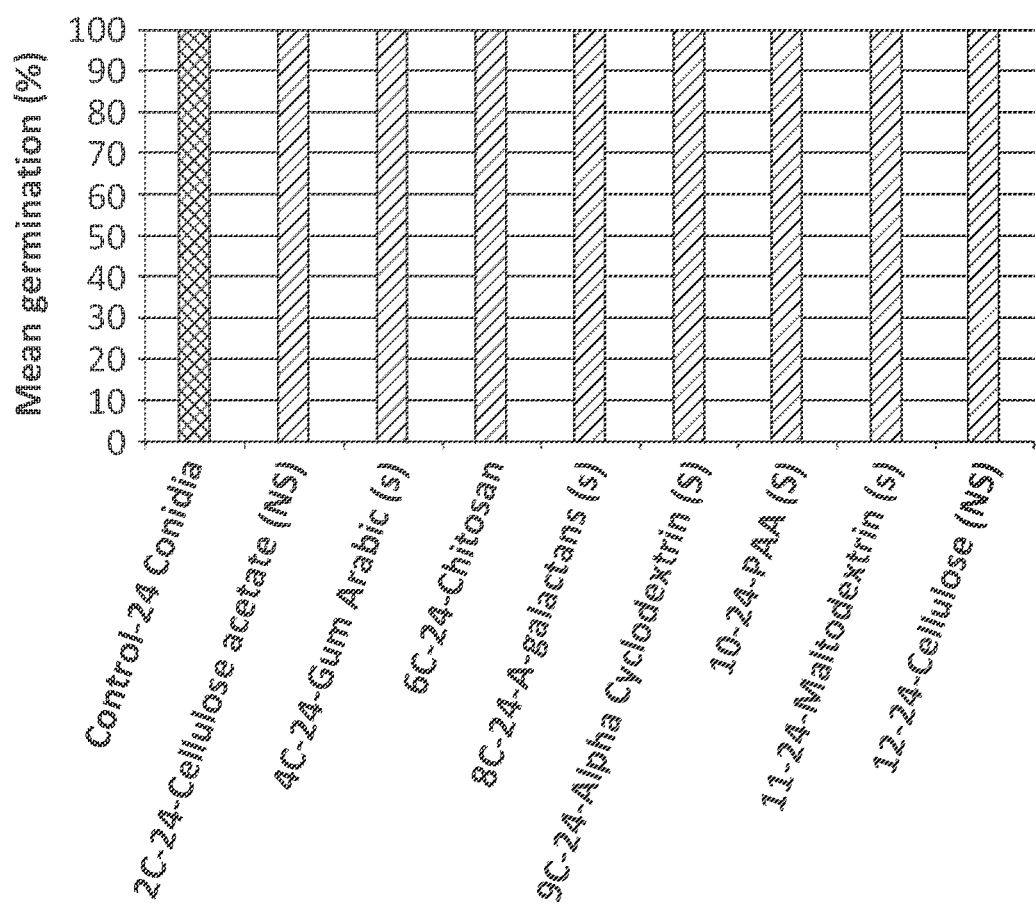
FIG. 12 shows germination of blastospores at 25° C.; 24 h (0.0995$a_w$=99.5% RH) on ½ Sabouraud Dextrose Agar.
Figure 13:
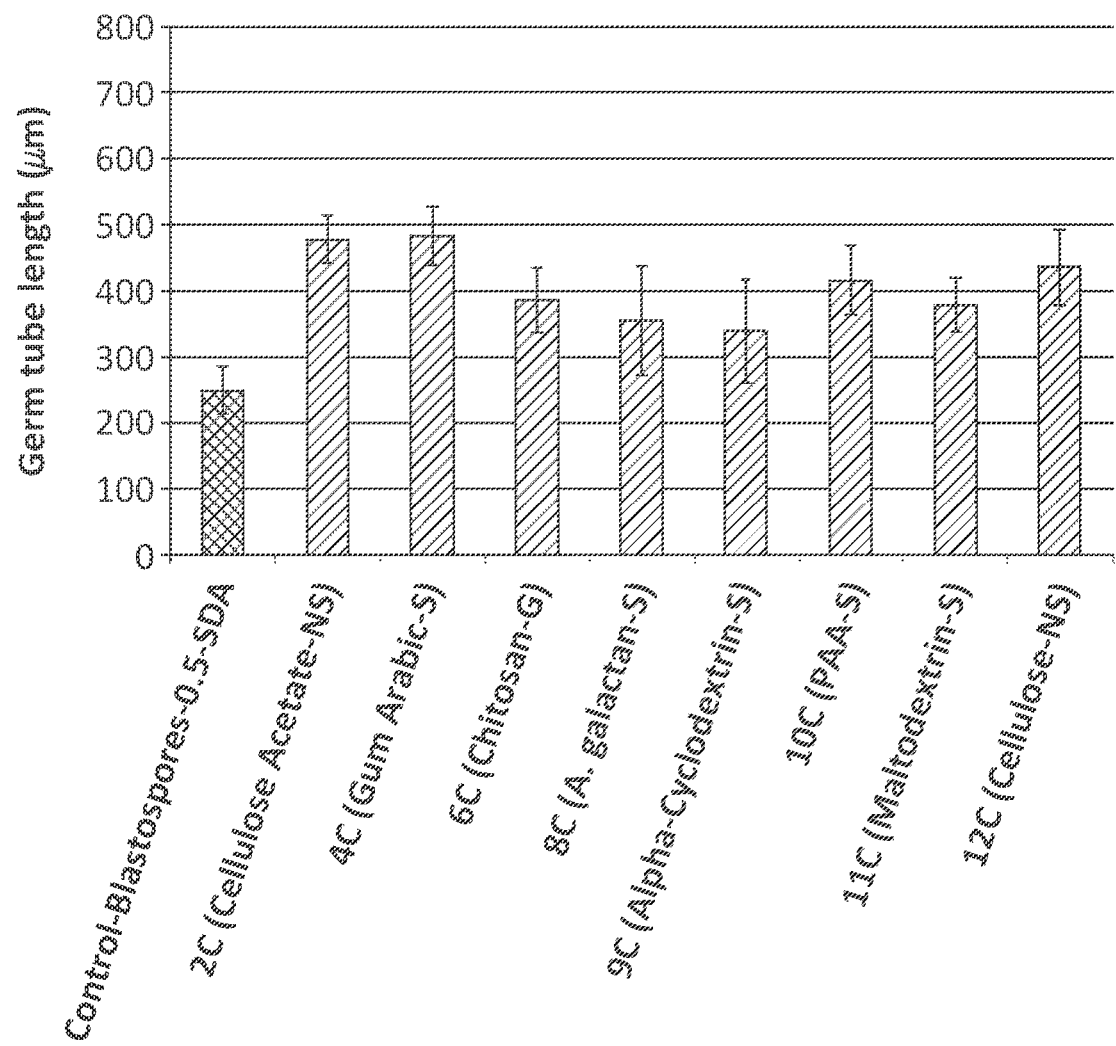
FIG. 13 shows germ tube length of germinating blastopores at 25° C.; 24 h (0.0995$a_w$=99.5% RH) on ½ Sabouraud Dextrose Agar.
Figure 14:
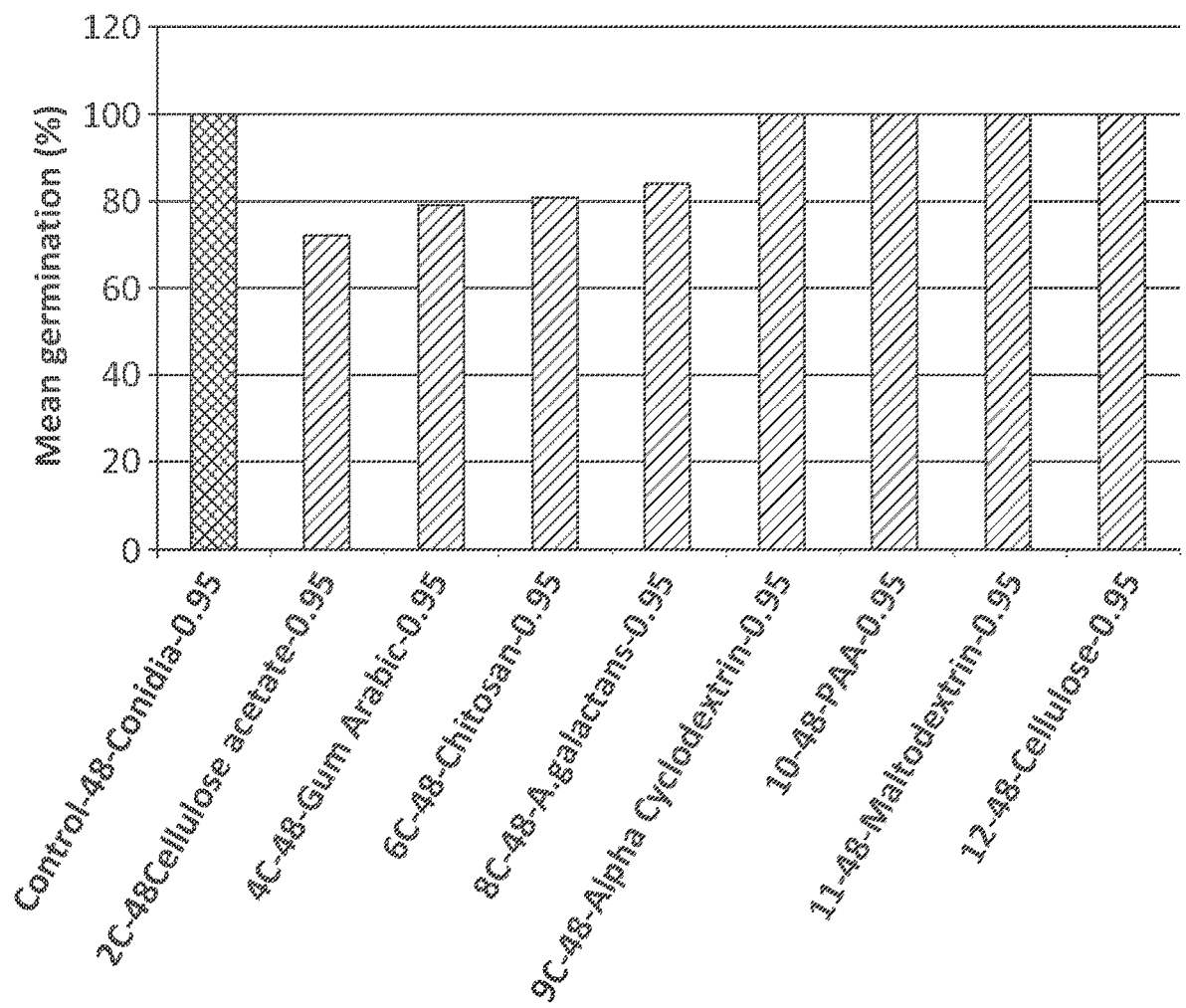
FIG. 14 shows conidial germination (%) after 48 h at 0.95$a_w$=95% RH) on ½ Sabouraud Dextrose Agar at 25° C.
Figure 15:
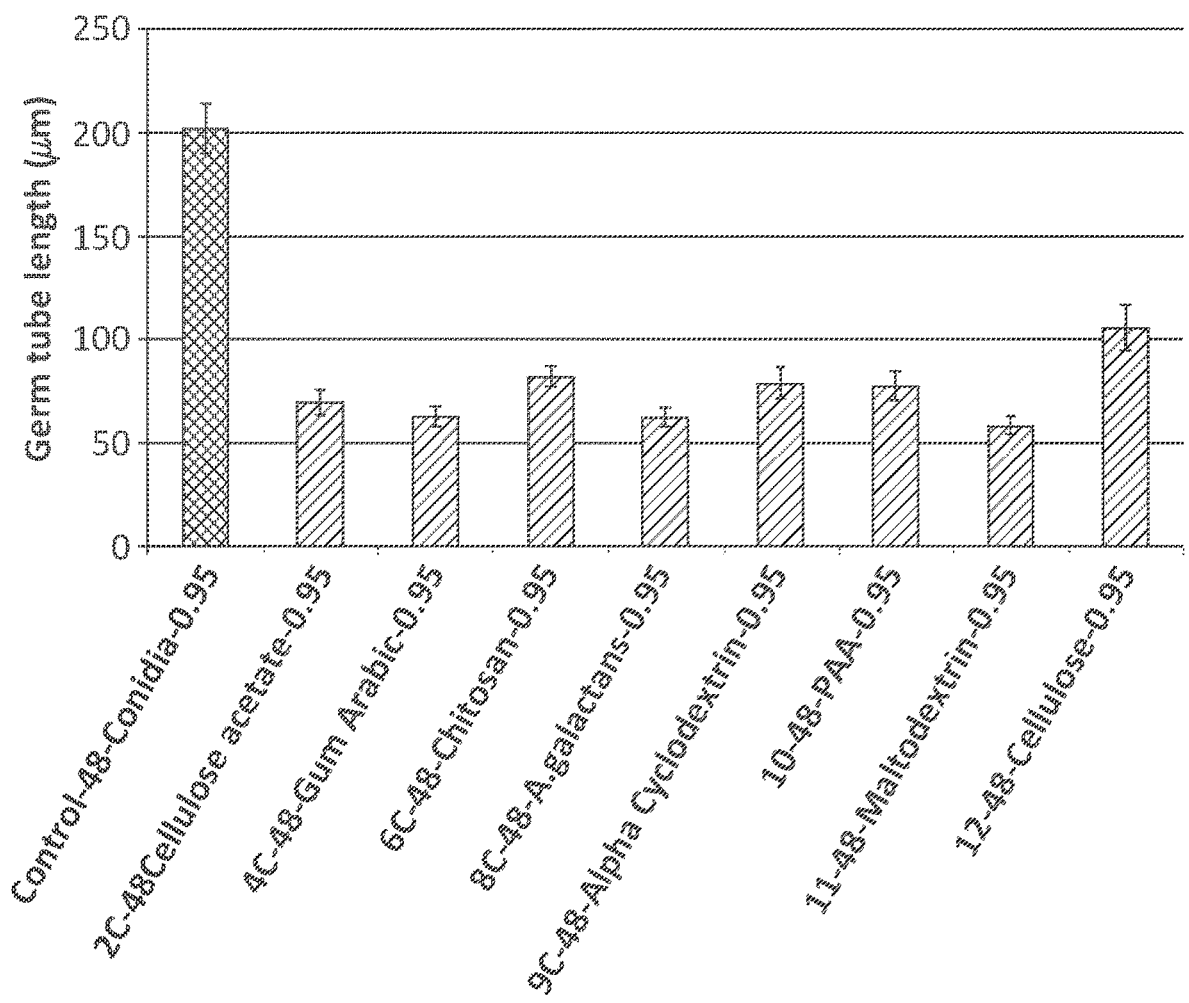
FIG. 15 shows germ tube length of conidia at 25° C.; 48 h (0.95$a_w$=95% RH) on ½ Sabouraud Dextrose Agar.
Figure 16:
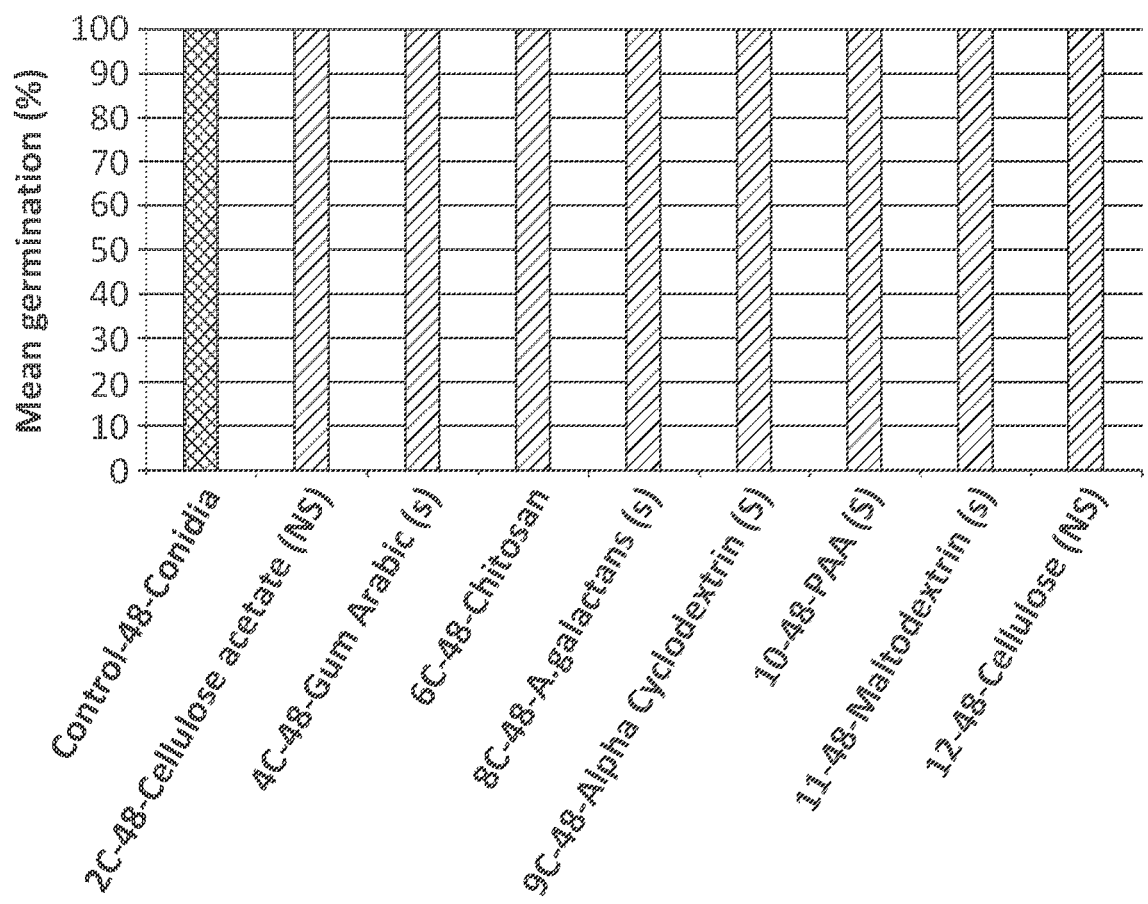
FIG. 16 shows germination of blastopores at 25° C.; 48 h (0.95$a_w$=95% RH) on ½ Sabouraud Dextrose Agar.
Figure 17:
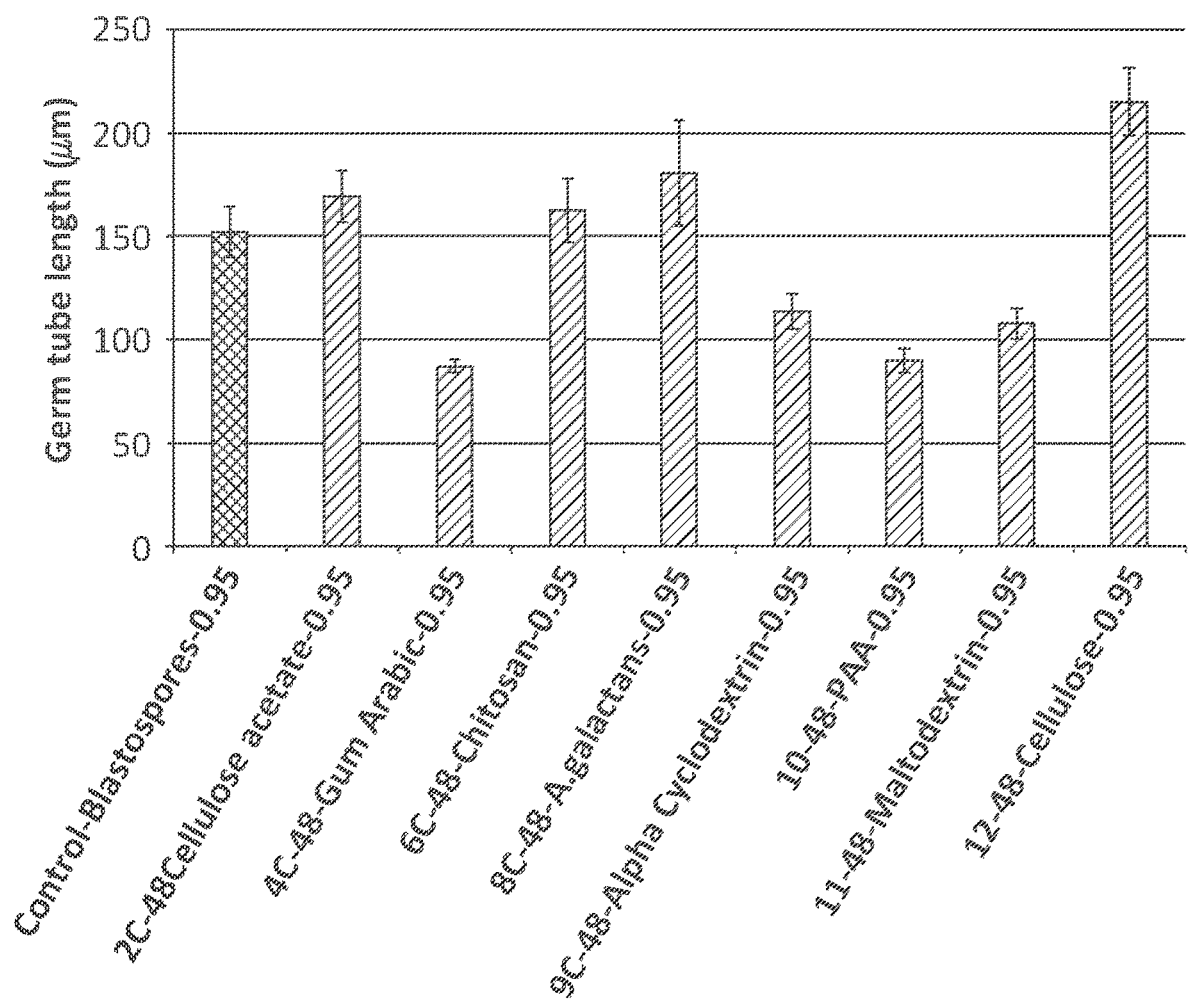
FIG. 17 shows germ tube length of germinating blastopores at 25° C.; 48 h (0.95$a_w$=95% RH) on ½ Sabouraud Dextrose Agar.
Figure 18:
FIG. 18, initial studies focused on formation of different conidial formulations which were made with different compatible compounds. Two examples which were then checked for germination after 4, 6 and 15 hrs at 25° C.
Figure 19A:
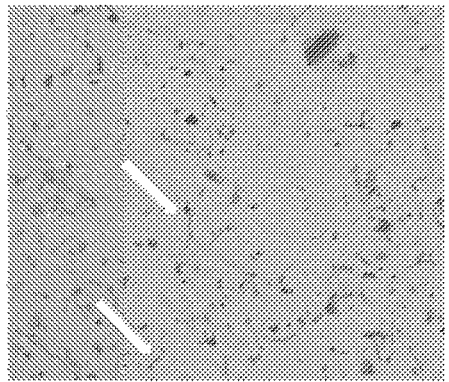
FIG. 19A: alginate/BNL 102/Fe(II) at 0.93 at 24 hours.
Figure 19B:
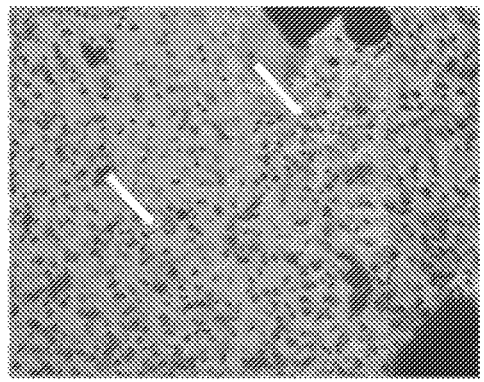
FIG. 19B: alginate/BNL 102/Fe(II) after 48 hours.
Figure 19C:
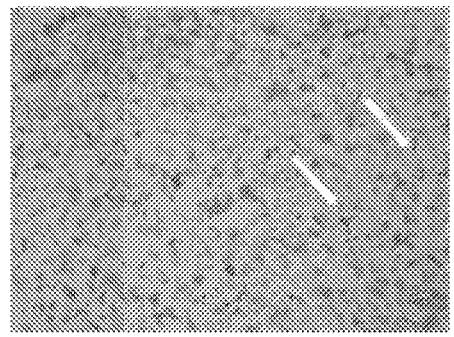
Figure 19D:
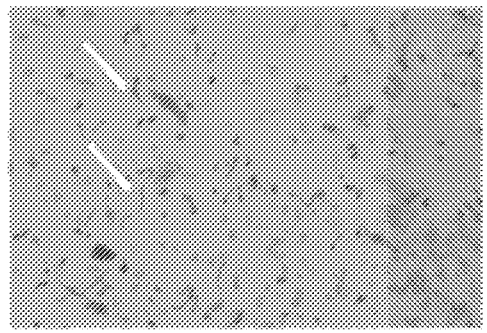
FIG. 19D: SDA after 48 hours.
Figure 20:
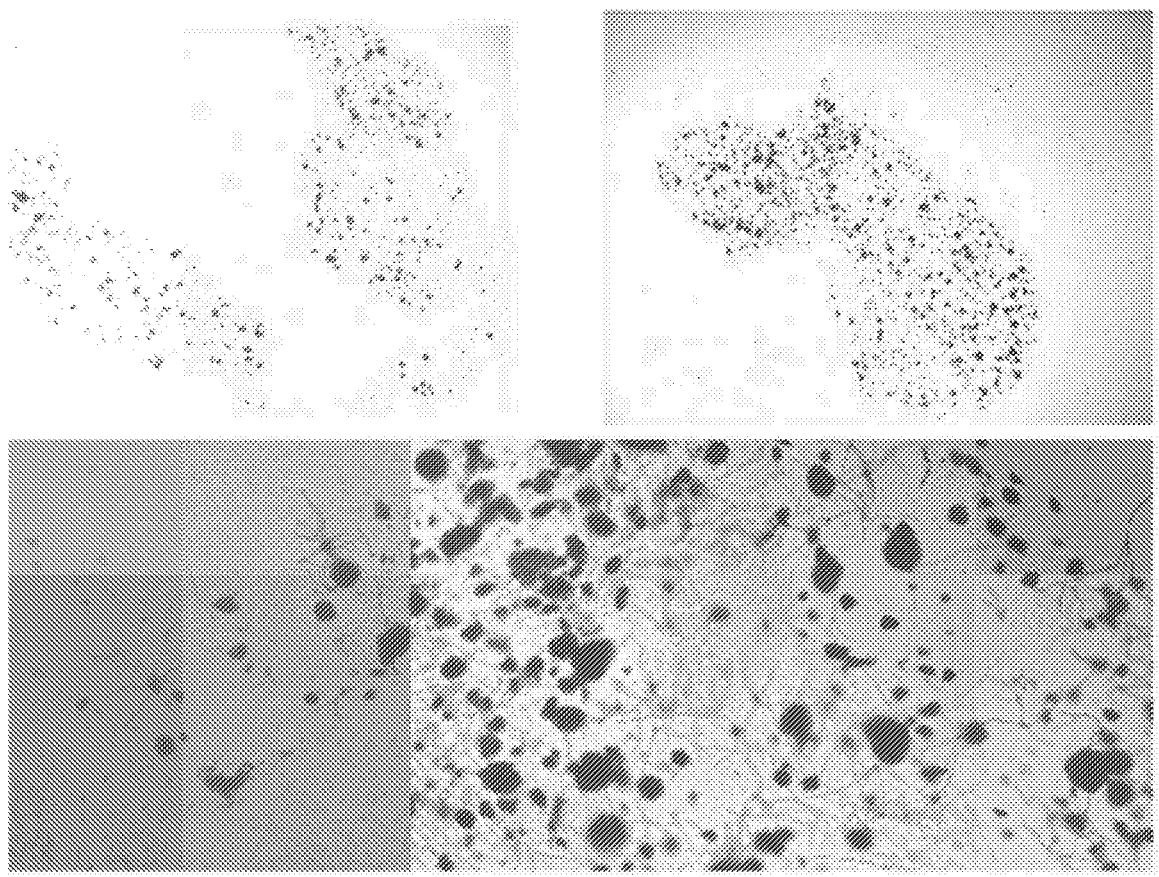
FIG. 20 shows microbeads: formulation gum arabic 1-5 hrs on ½ Sabouraud Dextrose Agar.
Figure 21:
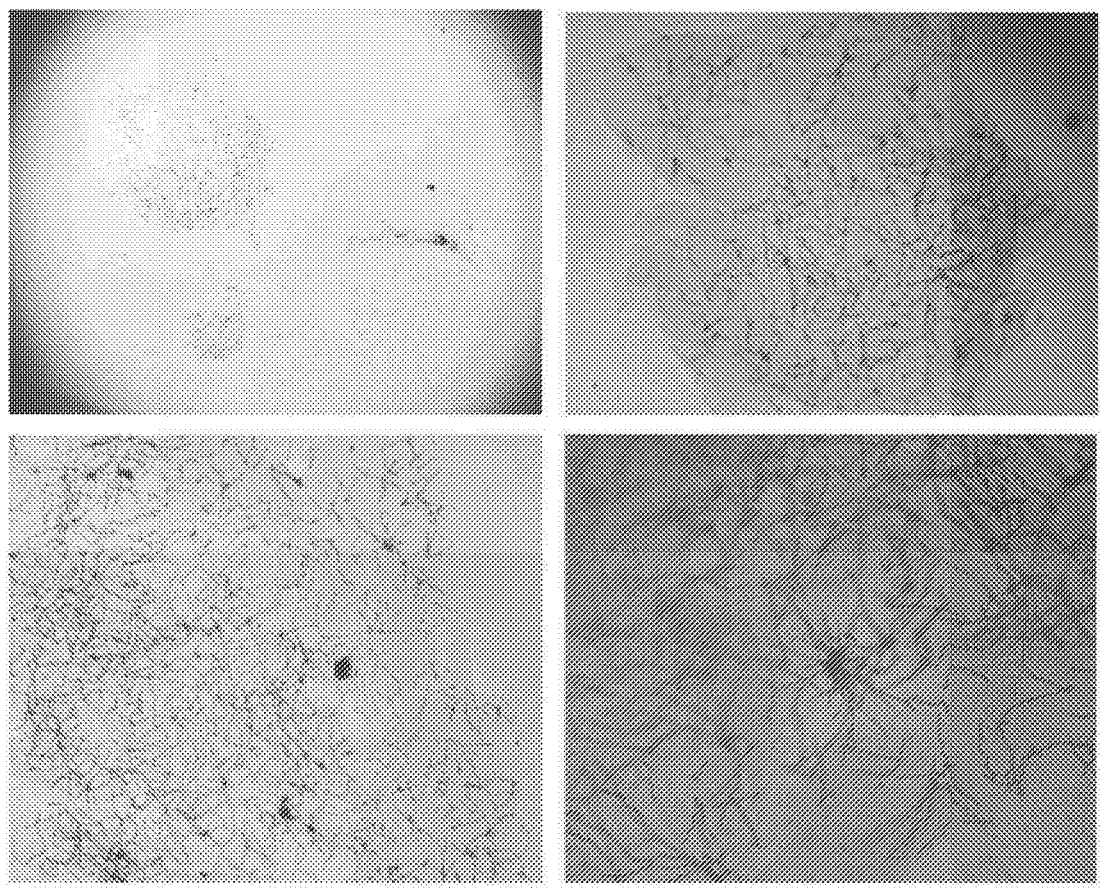
FIG. 21 shows microbeads: formulation maltodextrose 3-5 hrs-½ Sabouraud Dextrose Agar.
Figure 22:
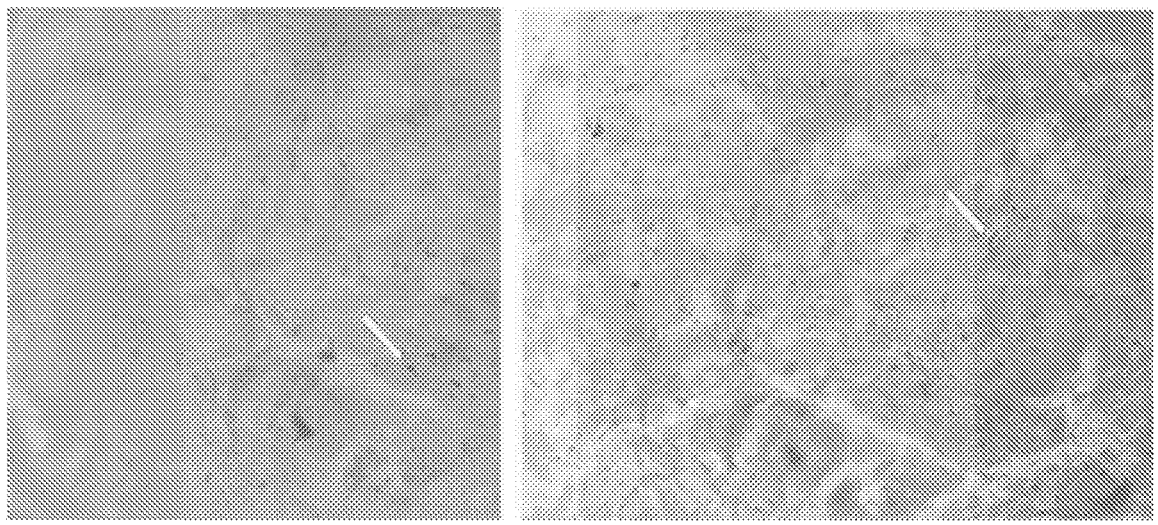
FIG. 22 shows formulation maltodextrose 1-5 hrs 0.95 $a_w$ ½ Sabouraud Dextrose Agar, some initial germination only.

Some such as cellulose acetate, cyclodextrin, maltodextrin and cellulose appear to be more compatible (FIG. 11).

After 24 h, no treatments, either conidial or blastospores, had germinated at 0.95 $a_w$(=95% ERH). Thus, germination and germ tube extension were examined quantified after 48 h.

FIGS. 14 and 15 show the effect of treatments on germination and germ tube extension respectively at 0.95 $a_w$, and 25° C. This showed that the control and four treatments had 100% germination compared with others (76-82%). The others showed less germination. However, the germ tube lengths were much shorter in the treatments than the controls (FIG. 15). There did not appear to be much difference between the compounds based on germ tube extension under water stress with all treatments inhibiting germ tube extension when compared to the controls.

For comparison, similar experiments were carried out with blastospores from liquid broth culture.

FIGS. 16 and 17 show the effects of different compounds on germination and germ tube extension of the blastospores. This shows that mixtures of all compounds with blastospores resulted in 100% germination. However, the germ tube length from the blastospores were again variable with some compounds resulting in better germ tube extension when compared to the controls at 0.95 $a_w$ and 25° C. after 48 h. In this case cellulose acetate, chitosan, alpha galactan, and cellulose appeared to be particularly good when compared to other compounds.

Example 7

Using techniques from Example 6:

Formulation of the best compatible compounds with conidia and blastospores of BNL 102.

Gel bead assays: The production of immobilised conidia of BNL 102 was examined by using different needle sizes for extrusion of the sodium alginate and compatible compound (1.25%) and conidial (log 6 spores/mL) mixtures. The solution was passed through a syringe and droplets formed gels in a 3% calcium chloride solution. By varying the needle size, it was possible to produce bead sizes of about 0.5 mm to 0.2-0.25 mm diameter. These were plated directly onto ½ strength SDA and ½ SDA/0.95 $a_w$, for examination of the viability after 3, 6 and 24 h. Sterile discs (6 mm dia.) were cut from the agar surface, stained, covered with a glass coverslip and examined under the microscope with a photo image capture software system to record germination.

Micro-scale gel bead production: It was decided that much smaller bead sizes were necessary for spraying—in the range 100-200 μm in diameter. It was thus decided to make specific mixtures of conidia or blastospores at two inoculum levels (log 4 and 6 spores/mL) for two compatible treatments of each. These were prepared as liquid suspensions. These are being used for bioassays. The compatible compounds and concentrations of the *M. anisoplae* BNL 102 propagules chosen were:

Conidial formulations:

1. Gum Arabic (106 cfu/mL)
2. Gum Arabic (104 cfu/mL)
3. Maltodextrin (106 cfu/mL)
4. Maltodextrin (104 cfu/mL)

Blastospore formulations

1. Gum Arabic (106 cfu/mL)
2. Gum Arabic (104 cfu/mL)
3. PAA (106 cfu/mL)
4. PAA (104 cfu/mL)

Production and Viability of Formulated Gels of Conidia and Blastospores

Initially two different sizes of gel beads were made with some of the compatible compounds and sodium alginate and conidia in Calcium chloride solution. FIG. 18 shows an example of the beads initially made. The smallest one was about 0.5 mm without any agitation of the Calcium chloride solution for gel formation.

10-12 beads were put in the water activity cell and measured this after formulation and removing excess water and then 4 h later at 25° C. in 50-60% RH. The results are shown in the Table 4 below.

Table 4 shows initial and final water activity of the smaller immobilized gel formulations using the Aqualab 4TE water activity machine. Samples of gels were kept at 25° C. and 50-60% RH. This clearly shows that there was a variation in the initial gel water activity depending on the compounds used for their formation. Initially they were all relatives wet with high water activities. However, after 4 h they had significantly dried to levels where no fungal growth would occur at all. This suggests that humectants or additives would be necessary to try and conserve water for longer time periods.

TABLE 4

Change in water activity during drying of formulated gel beads kept at 25° C. and 50-60% R. H.

| Compound | T = 0 | T = 4 hrs |
|---|---|---|
| Gum arabic | 0.9601 | 0.5095 |
| Arabinogalactan | 0.9647 | 0.5229 |
| Acrylic acid sodium salt | 0.9707 | 0.6113 |
| Maltodextran | 0.9669 | 0.5279 |

These beads were then plated onto ½ SDA and ½ SDA 0.95 water activity to examine the germination after 3, 6 and subsequently 15 h by staining. After 3 h there was no germination of the conidia regardless of treatment (4 different compounds and conidia). However, after 6 h we could see some germination on the ½ SDA medium with freely available water. FIG. 19 shows the germination of conidia from four different formulations made. There were some differences in germ tube lengths among formulations, but this would need to be quantified by measurement subsequently.

Microencapsulation of conidia into smaller beads using stirred calcium chloride solutions FIGS. 20 and 21 show examples of the much smaller beads which were subsequently made. These were variable in size but had much less conidial loads than previously. The average size of these beads was between 75-200 μm in diameter. The germination from these beads can be clearly seen after 15 h for two of the four formulations which have been sent to the applicant for bioassays.

It was noted that under water stress conditions, regardless of formulations made the germination was just beginning to take place at 0.95 aw after 15 h (FIG. 22).

Micro Formulation of Four Blastospore Formulations for Bioassays Two different compatible compounds were used for formulation of blastospores. Gum arabic and polyacrylic sodium salt were used.

Figure 23:
FIG. 23 shows formulation of blastospores (log 4 and log 6) in sodium alginate and gum arabic and PAA.
Figure 24:
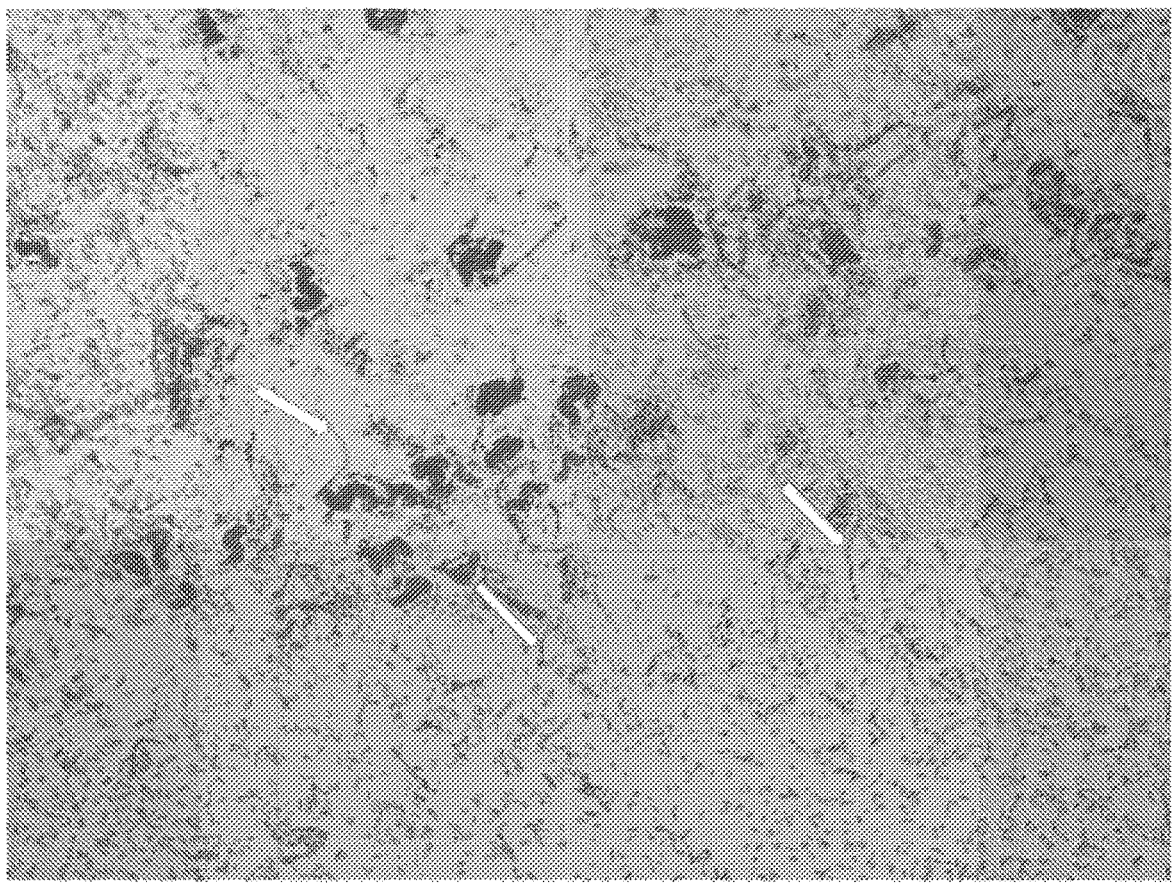
FIG. 24 shows germination of formulated blastospores in gum arabic after 24 hrs on ½ Sabouraud Dextrose Agar.

FIG. 23 shows the four formulations made and sent to the applicant for bioassays. FIG. 24 shows an example of the growth from blastospores after 24 h on ½ SDA medium.

Generally, growth was not as fast as for germ tube extension from conidia after formulation, with no growth from blastospore formulations at 0.95 $a_w$, ½ SDA medium even after 48 h at 25° C.

Example 8

Using techniques from Examples 6 and 7:
Dry Conidial Formulations for Dispersion as a Wettable Powder Conidia of *M. anisoplae* BNL 102 was immobilised in sodium alginate and five different compatible compounds (1.25% concentration). These have been mixed with magnetic stirrers and then the gels formed in 3% calcium chloride. About 20 mL of each formulation was used to prepare enough beads for drying and making of formulated powders and for viability assays on ½ strength SDA and the same medium at 0.95 water activity. The treatments used were:

1. Gum Arabic (soluble)
2. (+) Arabinogalactan (soluble)
3. Alpha-Cyclodextrin (soluble)
4. Poly (acrylic acid sodium salt) (soluble)
5. Maltodextrose (soluble)

Formulation of five different conidia for producing dry powders

Five (5) different formulations were made into small microcapsules of about 0.25-0.5 mm diameter. The intention here was to dry these down and to then make these into powders which could then be dispersed in water and a wetting agent and sprayed. However, when these were dried and ground up they formed fine layers of material containing the spores and not very particulate. This suggests that additional additives are required to be able to dry and then grind the gel beads into powders.

Figure 25:
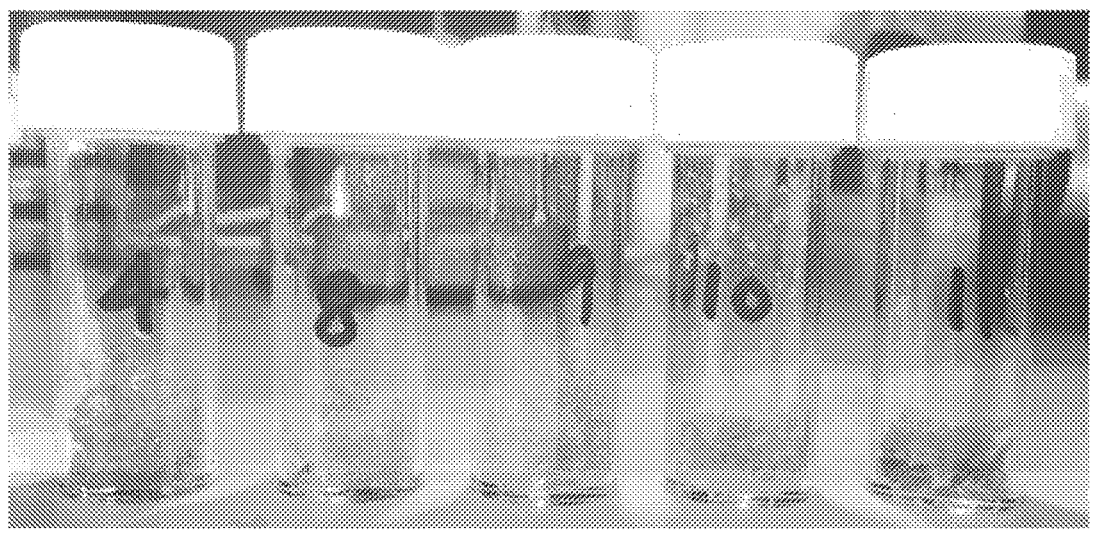
FIG. 25 shows production of different dry formulations using five different compatible compounds.

FIG. 25 shows the 5 different formulations after drying and grinding. Key to compounds used: 4, Gum Arabic (soluble); 8, (+) Arabinogalactan (soluble); 9, Alpha-Cyclodextrin (soluble); 10, Poly (acrylic acid sodium salt) (soluble); 11, Maltodextrose (soluble)

Example 9

Figure 27A:
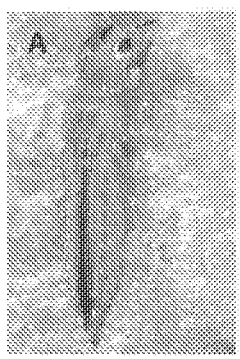
FIG. 27A-FIG. 27C: shows WFT after contact with different formulation containing *Metarhizium anisopliae* BNL 102.

Using techniques from Example 6 to 8:
Infectivity of formulated materials against adult WFT
Rearing of WFT A colony of WFT was maintained at Bioneas described by Ansari et al. (2007). Briefly, WFT were reared in ventilated plastic containers (29×29×16 cm) kept at 28±1° C., 50-60% r.h., and L16:D8 photoperiod. Between 40-50 adult WFT were introduced into the containers and provided with 3-4 pieces (8-9 cm length) of green bean (*Phaseolus vulgaris* L.) for oviposition and 2-3 yellow chrysanthemum flowers (Asda). After 3 days, the beans were transferred to fresh ventilated plastic containers (28×20×10 cm). Adults WFT were used in all bioassays (FIG. 27A).

Formulations

The following formulations were received by the applicant from a CRO, for bioassay test. Products were stored at 10° C. until use.

Formulation from dry conidia of BNL 102
1. Gum Arabic (106 cfu/mL)
2. Gum Arabic (104 cfu/mL)
3. Maltodextrin (106 cfu/mL)
4. Maltodextrin (104 cfu/mL)

Formulation blastospore of BNL 102
1. Gum Arabic (106 cfu/mL)
2. Gum Arabic (104 cfu/mL)
3. PAA (106 cfu/mL)
4. PAA (104 cfu/mL)

Formulations testing against adult WFT

These experiments were designed to evaluate the infectivity of different formulations against adult WFT. Assays were conducted in white opaque plastic containers (25×25 cm; 15 cm in depth; surface area 625 $cm_2$) as described by Ansari et al. (2011) with slight modification. One ventilation hole (10×10 cm) was made in each lid and covered with nylon gauze (64 mm pore size). A double layer of moist tissue paper was placed in each container so that it covered the bottom and halfway up each side. Three fresh beans and five chrysanthemum flowers were placed on the top of the tissue paper. After that, conidia and blastospore formulations at the rate of $10^4$ and $10^6$ $cfu/cm_2$ were sprayed using a hand-held sprayer (pore size 300 μm) (FIG. 29).

For each replicate, approximately 400 adult WFT were released into each container. WFT were therefore continually exposed to formulations through tarsal contact or on the head and thorax region for the duration of the study. The tissue paper remained in the container until the end of the test (a minimum of 72 h). Control WFT were treated in the same way but in the absence of conidia or blastospore formulation. Containers were kept in a constant temperature room (28±1° C., 80-90% r.h., and L16:D8). WFT survival was monitored daily 5 for 72 h. Dead WFT were collected individually from each container, dipped in 70% ethanol, and incubated on moist tissue paper in Petri dishes (25±1 C for 2-3 days) after which they were examined using a light microscope at magnification 40× for evidence of fungal sporulation. Each treatment was replicated four times and the whole experiment was conducted twice.

Bioassay Results

Overall bioassays results showed that blastospore formulations were better than the conidial formulations and providing >80% WFT control.

Conidial Formulations

Figure 26:
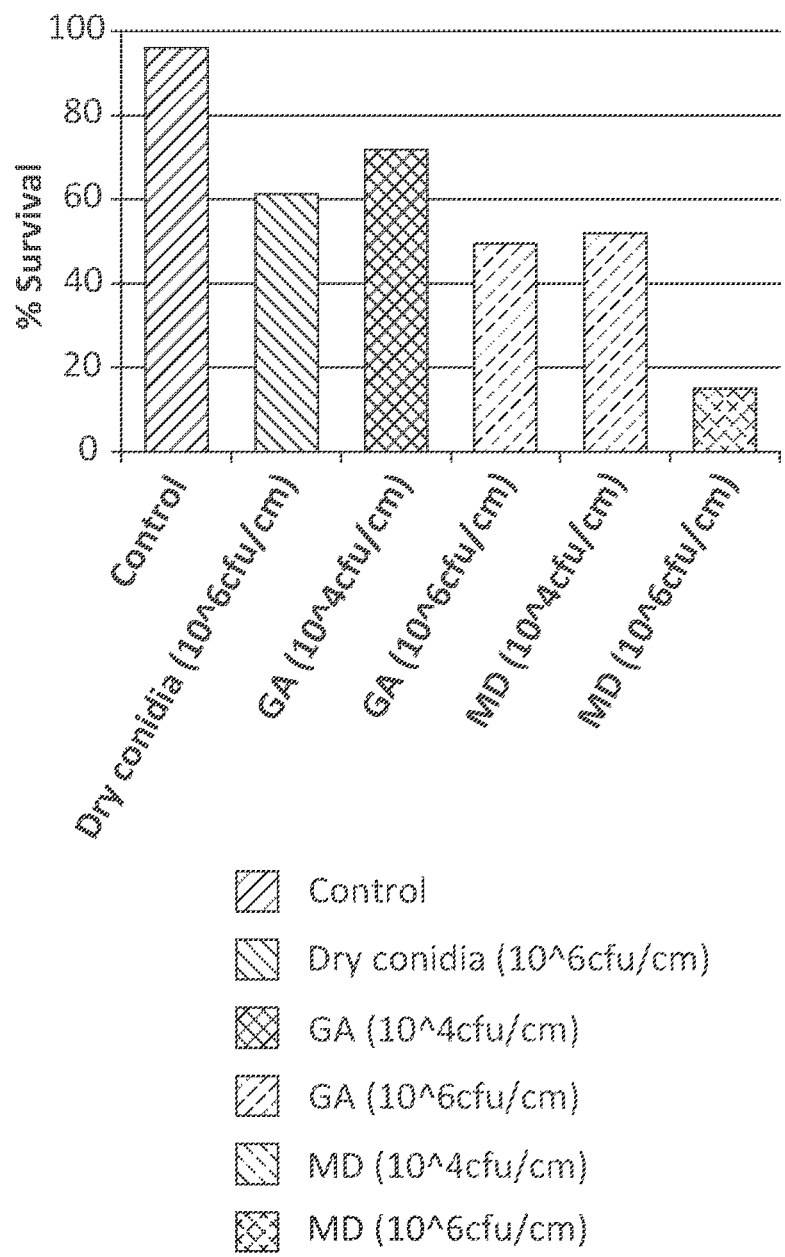
FIG. 26 shows effect of formulation on adult WFT survival. Mean cumulative proportional survival of adult WFT exposed for 3 days to dry conidia (106 cfu/cm—unformulated), gum arabic (104 cfu/cm), (106 cfu/cm), maltodextrin (104 cfu/cm) and maltodextrin (106 cfu/cm) of entomopathogenic fungi *Metarhizium anisopliae* BNL 102. Control treatment was not exposed to any fungus ('0' dose). Data represent survival of four replicates of approximately 400 adult males and females/replicates.
Figure 27B:
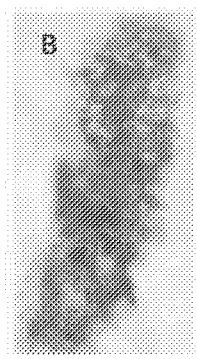
Figure 27C:
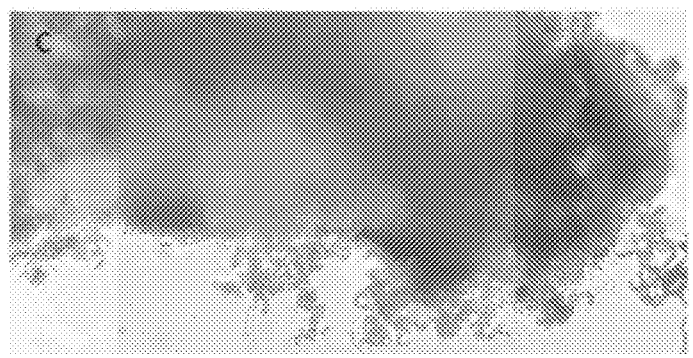

Both Gum Arabic and Maltodextrin formulations significant reduced WFT survival compared with untreated control 3 days after exposure (FIG. 26). Overall, conidia formulated in Maltodextrin was the most effective formulation and caused a significantly greater reduction in WFT survival compared with Gum Arabic formulation. Following continuous exposure, 100% mortality (confirmed by fungal sporulation on WFT cadavers; FIG. 27) was observed with both formulation by day 5 compared to estimated cumulative mortalities of 38.8%, 28.3%, 50.5%, 48.1 and 85.0% for Dry spore ($10^6$ cfu/cm—unformulated), GA ($10^4$ cfu/cm), GA ($10^6$ cfu/cm), MD ($10^4$ cfu/cm) and MD ($10^6$ cfu/cm), respectively. Control treatments showed 4.0% (with 0% sporulation) WFT mortality 5 days after treatment.

Blastospore Formulations

Figure 28:
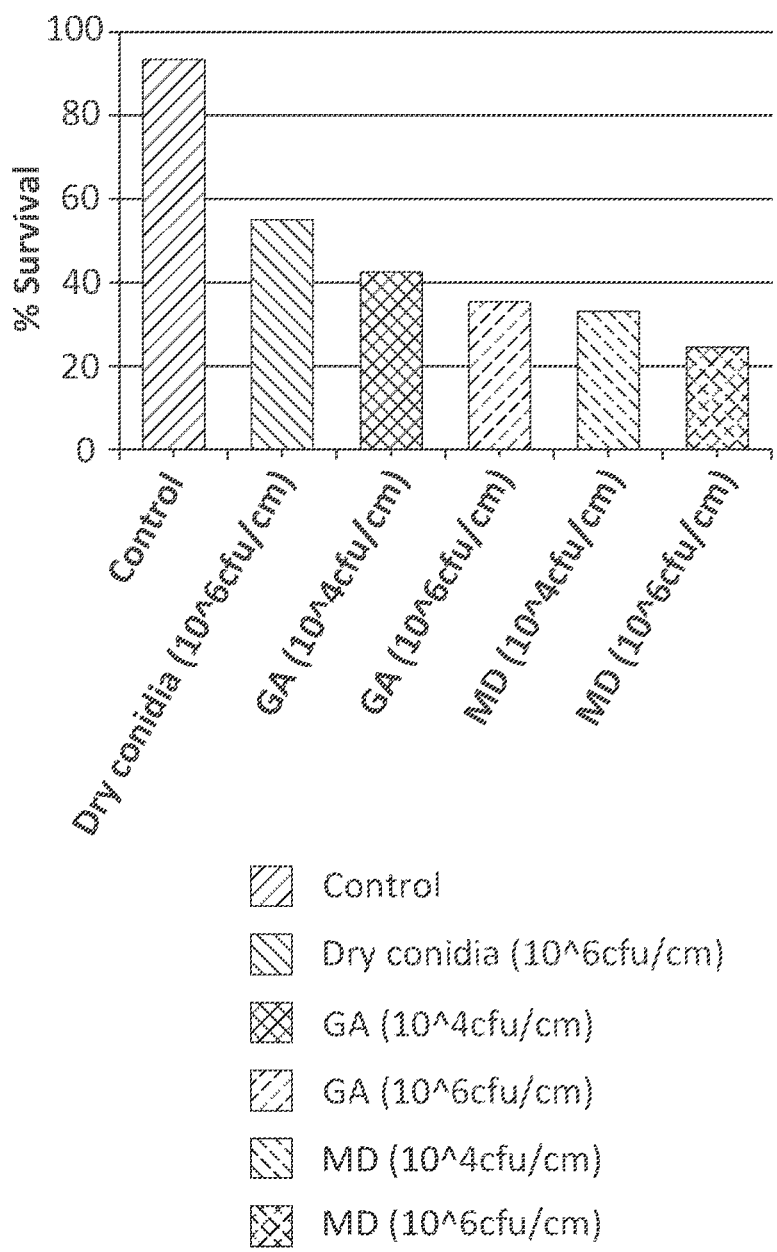
FIG. 28 shows effect of formulation on adult WFT survival. Mean cumulative proportional survival of adult WFT exposed for 3 days to dry conidia (106 cfu/cm—unformulated), Gum Arabic (104 cfu/cm), (106 cfu/cm), Maltodextrin (104 cfu/cm) and Maltodextrin (106 cfu/cm) of *Metarhizium anisopliae* BNL 102. Control treatment was not exposed to any fungus ('0' dose). Data represent survival of four replicates of approximately 400 adult males and females/replicates.
Figure 29A:
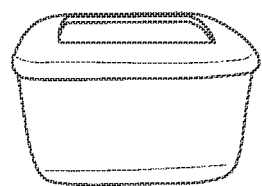
FIG. 29A-FIG. 29E.
Figure 29B:
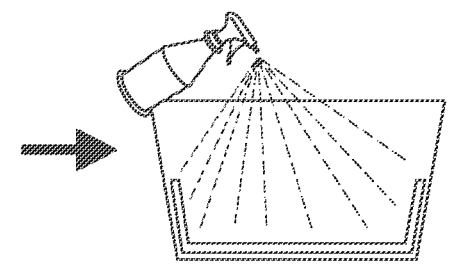
Figure 29C:
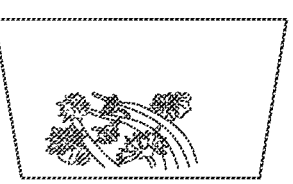
Figure 29D:
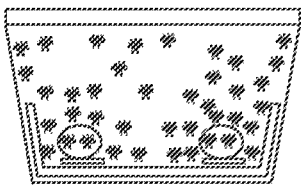
Figure 29E:

Both Gum Arabic and Maltodextrin formulations significant reduced WFT survival compared with untreated control 3 days after exposure (FIG. 28). Overall, conidia formulated in Maltodextrin was the most effective formulation and caused a significantly greater reduction in WFT survival compared with Gum Arabic formulation. Following continuous exposure, 100% mortality (confirmed by fungal sporulation on WFT cadavers) was observed with both formulations by day 5 compared to estimated cumulative mortalities of 45.0%, 57.5%, 65.0%, 67.0% and 75.6% for Dry spore ($10^6$ cfu/cm—unformulated), GA ($10^4$ cfu/cm), GA ($10^6$ cfu/cm), MD ($10^4$ cfu/cm) and MD ($10^6$ cfu/cm), respectively. Control treatments showed 4.0% (with 0% sporulation) WFT mortality 5 days after treatment.

Conclusions from Examples 6 to 9

Compatibility Studies

The compatibility study has shown that there is good compatibility between both conidia and blastospores with many of the compounds.

The important data was found to be related to capability for conidial or blastospore germ tube extension where differences were observed at both 0.995 $a_w$ after 24 h, and at 0.95 aw after 48 h.

Formulations of Conidia and Blastospores

Overall, three different types of formulations were prepared. Because two sizes pf particles were considered large (0.25-0.75 mm diameter) a mixing system with a magnetic stirrer was used to obtain much finer formulated conidia and blastospores to obtain the range of sizes necessary.

In some embodiments, if bead size is not controlled, beads formed may be of variable sizes. This could preferably be improved by using, for example, a propeller-based mixing system with different speeds and propeller sizes.

Overall, germination of both conidia and blastospores was not initiated after about 4 h. However, after 6 h this was initiated in the formulations made with the two compounds used for both types of propagules, regardless of inoculum level.

Blastospore formulations were more sensitive to formulation than the conidia.

Overall, growth from blastospores, even with freely available water was not as good as that from conidia formulations after 24 and 48 h. This could be due to blastospores, while being more virulent in killing insect pests, are more sensitive to desiccation and less amenable to formulation because of the more fragile nature of the mycelial cell wall vs the conidia which have a thicker wall and are more resilient.

Production of the five dry formulations was attempted. We were able to produce the microencapsulated conidia in 0.25-0.5 mm gels. These were dried and then ground. In some instances, this may result in fine sheets/fragments of the encapsulated products.

This may be suitable for particular applications. In applications requiring powdered product, it may in some such cases be required to provide additional additives, such as for example, dispersants; stickers; and/or fillers to provide a dry powder-based product. Examples of such products will be known to the skilled addressee.

Bioassays

This study looks to demonstrate the efficacy of entomopathogenic fungus formulated products against adult WFT. Whilst all formulations and doses tested significantly reduced WFT survival, conidia or blastospore formulated in maltodextrin was the most effective formulation and caused a significantly greater reduction in WFT survival compared with gum arabic formulation at higher dose.

Larvae of WFT also cause considerable damage.

Adult WFT are very mobile and it is therefore important to acquire enough formulated product on the leaf surface.

Following continuous exposure, 100% mortality was confirmed. The presence of fungal sporulation on WFT cadavers confirmed that infected insects can transmit fungal spores to other healthy insects, further reducing the pest population.

Spraying nozzles vary in size. Formulated microcapsules for use in spraying are preferably provided which are suitable for use in conventional spraying nozzles (100, 200, 300 μm) and specially designed spraying nozzles depending on the application. It is preferable to tailor the size of any formulation to the desired spraying nozzle, or optionally vice versa, to enable an even spraying.

Figure 30:
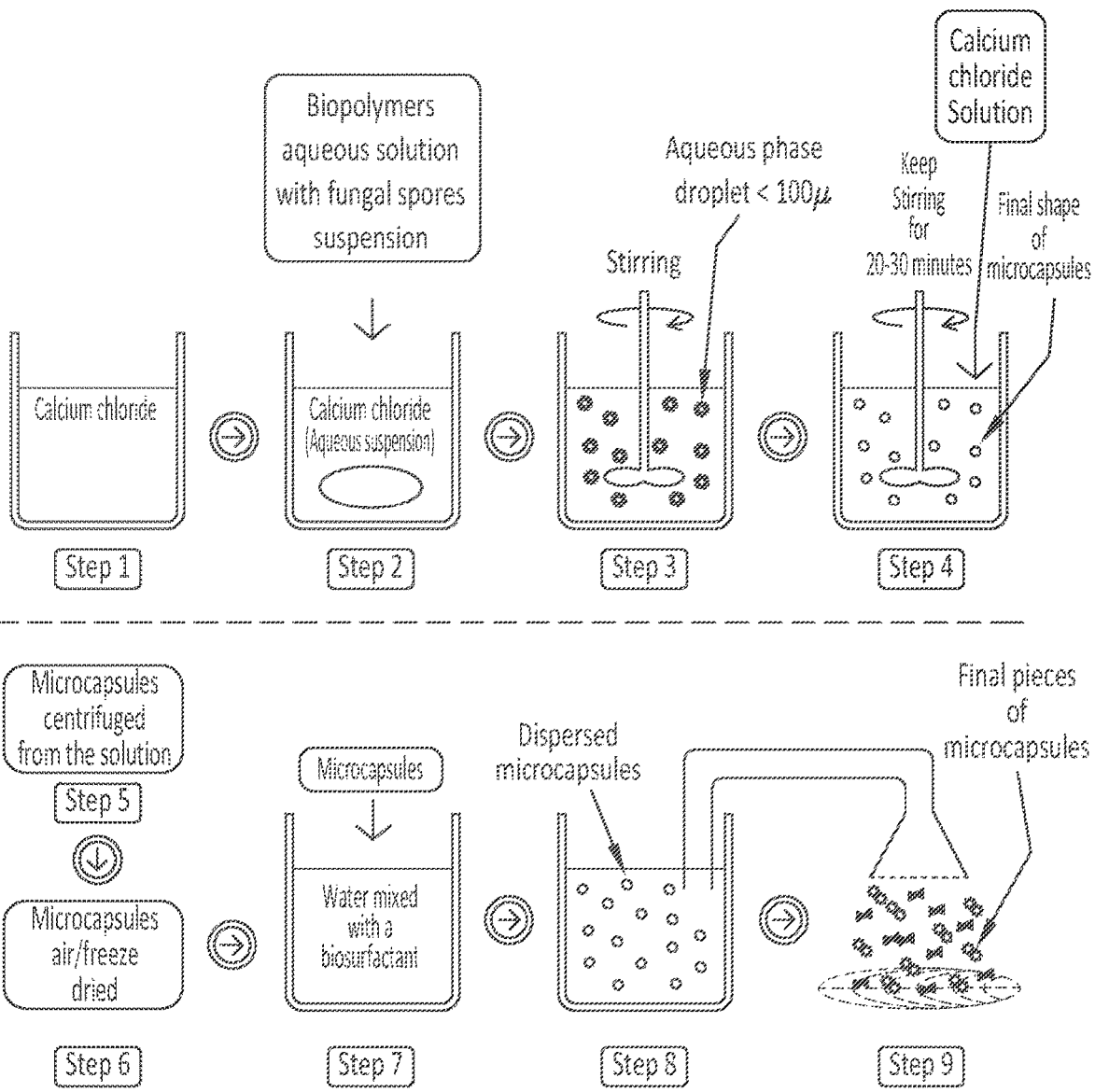
FIG. 30 shows a preferred method of preparing a microencapsulation composition in accordance with a third aspect of the present invention: A mixture of calcium chloride and entomopathogenic fungus, *Metarhizium anisopliae* strains BNL 101 and BNL 102.

A method of preparing a microencapsulation composition in accordance with a third or fourth aspect of the present invention is provided in FIG. 30. FIG. 30 provides for the method that is used to produce a composition comprising a mixture of BNL 101 and BNL 102 according to the first aspect of the present invention. Embodiments are available wherein the method is used to produce a composition comprising only BNL 101 or BNL 102.

Example—Microencapsulation of Fungal Spores—Novel Microencapsulation of Fungal Spores for Major Crop Pest Control and Effective Integrated Pest Management Procedures The control of insect pests using entomopathogenic fungi to avoid chemical pesticides application and to increase environmental protection is provided via the present biopesticides formulations. For the safe and targeted application, the fungal biopesticide must be formulated in a way that maintains the viability, stability, virulence of fungal conidia, and that protects them from adverse effects of environment. The product is also economical (less expensive than other available pesticides and biopesticides) and easy to apply.

There are several approaches for preparing biopesticide formulations. One preparation provides for the encapsulation of the fungal spores in polymers. The material compositions for the biopesticides described here include gelatin, chitosan, sodium alginate, hydroxypropyl methyl cellulose (HPMC), dextrin, cyclodextrins, aliphatic polyesters, such as homo and copolymers of lactate and glycolate (PLA, PGA, and PLGA), poly and caprolactone (PCL), polyhydroxyalkanoates (PHA), cassava starch. These agents are described generally in Liu & Liu, 2009 and Rodrigues et al., 2017.

To microencapsulate the spores of *metharizium anesoplea*, the alginic acid, Na salt from Acros Organic or Sigma-Aldrich was used as a base polymer. Sodium alginate (SA) is a linear heteropolysaccharide with two structural units—D-mannuronic and L-guluronic acids. In the process of encapsulation, the spores were entrapped in a 3-D lattice of ionically crosslinked alginate.

To modify the properties of microcapsules, the following co-polymers were used:
1. Pectin (PE) from citrus peel—natural polysaccharide, composition: galacturonic acid ≥74.0% (dried basis), <10% moisture. Produces insoluble salt calcium pectinate.
2. Hydroxypropyl methylcellulose (Hypromellose, HPMC)—semisynthetic viscoelastic polymer H7509, Sigma, viscosity 2,600-5,600 cP, 2% in $H_2O$ (20 C).
3. Methylcellulose (MC)—M0562, Sigma, viscosity 400 cP, 2% in $H_2O$ (20 C).
4. Gum Arabic (GA) from acacia tree, brunched polysaccharide—G9752, Sigma.
5. Guar Gum (GG) galactomannan polysaccharide extracted from guar beans—G4129, Sigma.

All copolymers used are nontoxic, nonallergenic, and edible substances.

The co-polymers of different viscosity were chosen as modulators of the microcapsules morphology: lower viscosity allows to obtain smaller and spherical microspheres, whereas polymers of high viscosity produce larger and elongated microspheres and may increase the degree of agglomeration of microspheres (L. W. Chan, et al., 1997).

Capsules Containing Spores-Production

For the *M anisopliea* spores microencapsulation, the method of emulsification-gelation was used. This emulsification method was modified. Modifications as described in Xue J., Zhang Zh., 2009, were considered. The spores of entomopathogenic fungus *M. anisopliea* obtained from Bionema Ltd (~600 mg).

Figure 31:
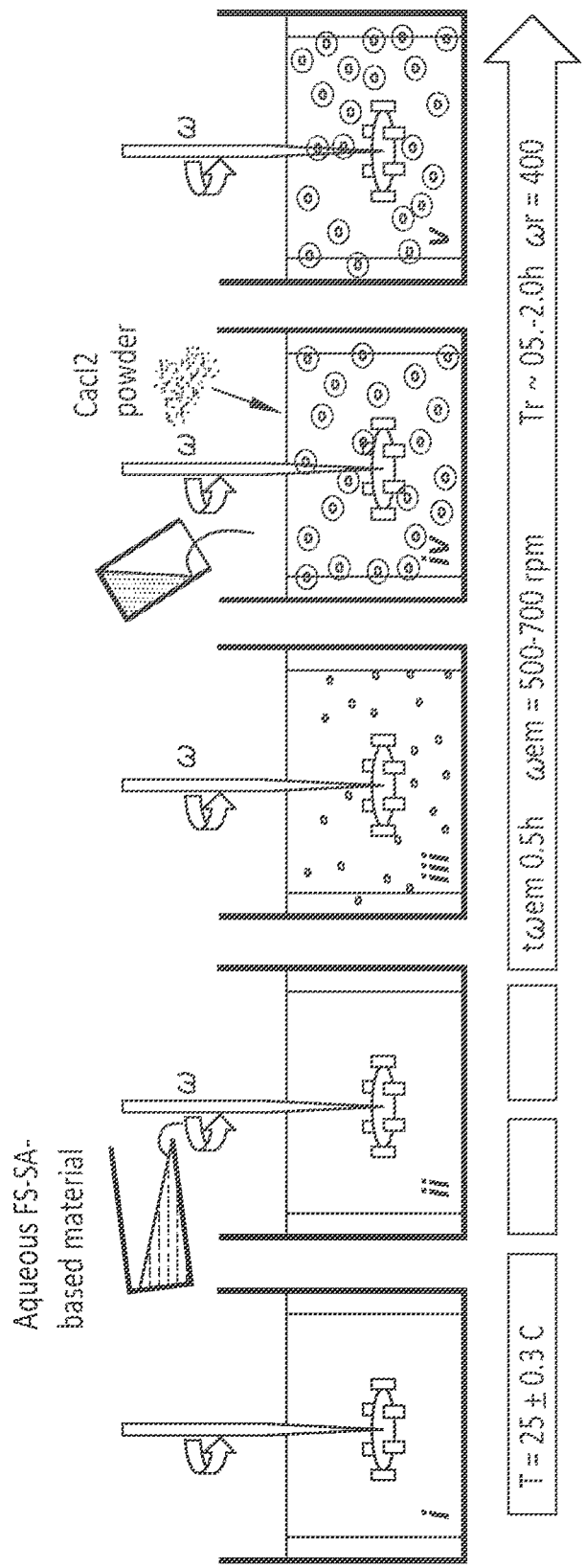
FIG. 31 shows the schematic diagram of the emulsification-gelation process. Addition of a fungal spores-containing sodium alginate aqueous solution. W/O emulsification to the desired μ-scaled size; ω=500-600 rpm. Emulsification of Internal Phase droplets containing the viable fungal spores. $CaCl_2$ powder to dispense slowly—dissociation reaction $CaCl_2$ (aq) $\rightleftharpoons Ca^{2+}+2Cl1^-$. on-exchange mechanism initiation/progression: SA $(C_6H_7NaO_6)_n$ to $[Ca(C_6H_7O_6)]_n$ Microcapsules collection at the bottom of the tank.
Figure 32:
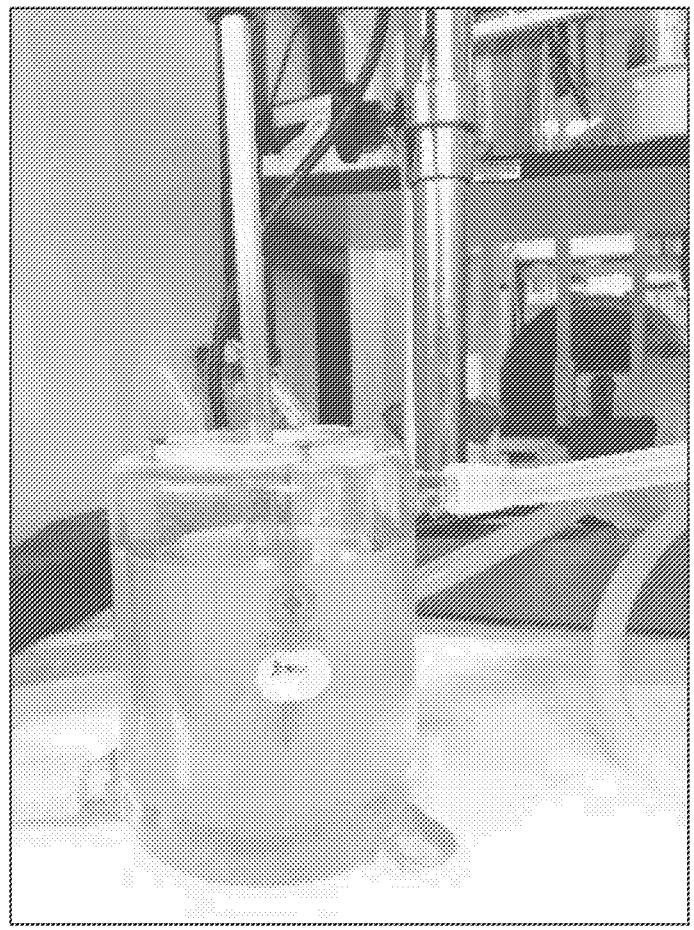
FIG. 32—Microcapsules formation. The 1.5%, 2%, 3% and 4% sodium alginate solution were tested and 2% and 1.5% have been selected for further study.

The schematic diagram of the emulsification-gelation process is shown in FIG. 31.

The *M. anisopliea* spores are highly hydrophobic, to disperse them 0.03% Tween-80 solution was used. The concentration of the working suspension was ~$10^7$ (1 mg/ml). (FIG. 31).

The required amount (200 ml) of a continuous oily phase (sunflower oil, bought from a local market So $\cong 0.9$ g·mL$^{-1}$) was put into a jacketed 250 ml reactor, the temperature of the reactor was stabilised at 25° C. Fungal spores suspension was mixed with the solution of the polymer/polymers to a required concentration of a polymer. The mixture of spores and polymer was dispersed in oil by a turbine impeller at the agitation speed of 400 rpm for 30 min to form a stable emulsion. CaCl$_2$ powder (1 g-250 mg) was added slowly into the water/oil (w/o) system. Agitation was maintained for another 2 h or as stated. The formed microspheres settled at the bottom of the stirred vessel were collected after the agitation was stopped by vacuum filtration, washed by 0.03% Tween 80 solution and dried at room temperature.

Figure 33A:
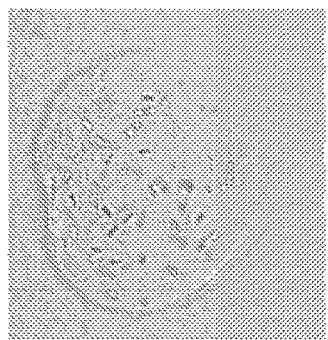
FIG. 33—Examples of spores-containing alginate-base microcapsules: a) light microscopy, b) as observed under the light microscope of the micromanipulation rig, c) scanning electron microscopy. Bars at a) and b) are 100 μm.
Figure 33B:
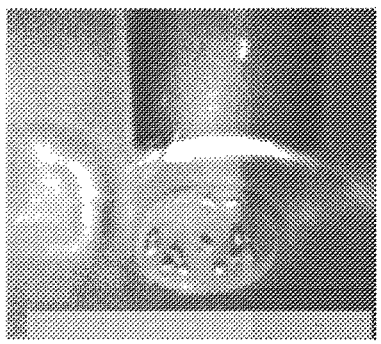
Figure 33C:
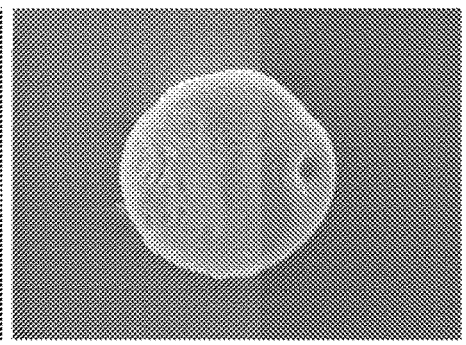
Figure 34A:
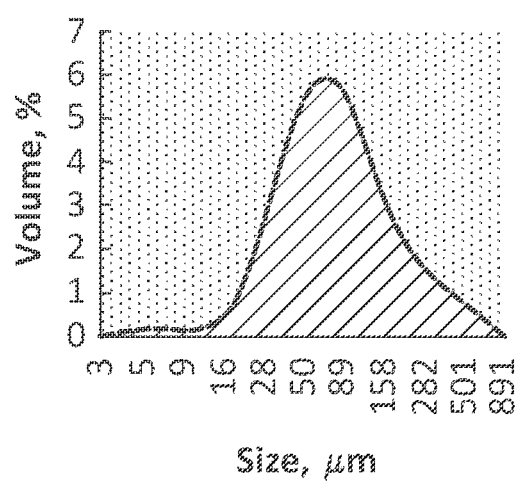
FIG. 34A-FIG. 34B. The diagram of the microcapsules size distribution of the samples prepared at stirring speed of 700 rpm (SAFS002 2% SA, FIG. 34A) and 430 rpm (2% SA+PE+HPMC 2:1:1, FIG. 34B)
Figure 34B:
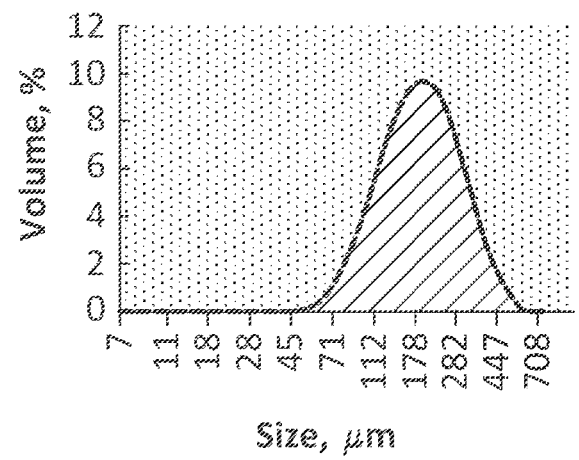

(30%, 20%) of a co-polymer, such as HPMC and MC, tend to agglomerate more as compared to 10% co-polymer addition. The study of formulations of sodium alginate microcapsules with gum Arabic and Guar gum as a co-polymer Characterization of Capsules Containing Spores The microcapsules produced were observed routinely under the light microscope. The microcapsules of different composition showed slightly irregular spherical or oval shape, they were varied in size and size distribution depending on steering speed used to prepare emulsion. FIG. 33A-33C show an example of a capsule using different microscopy techniques. Top-view (33A), side view (33B), SEM view (33C).

Capsules size distribution was studied using laser particle size analyser Mastersizer 2000. According to our observation, the optimal stirring speed for formulation of microcapsules of ~50-80 μm in diameter is about 700 rpm.

Preparations containing the co-polymers of higher viscosity (pectin, HPMC) were tending to form two-peak size distributions.

Viability of Encapsulated Spores.

Figure 35:
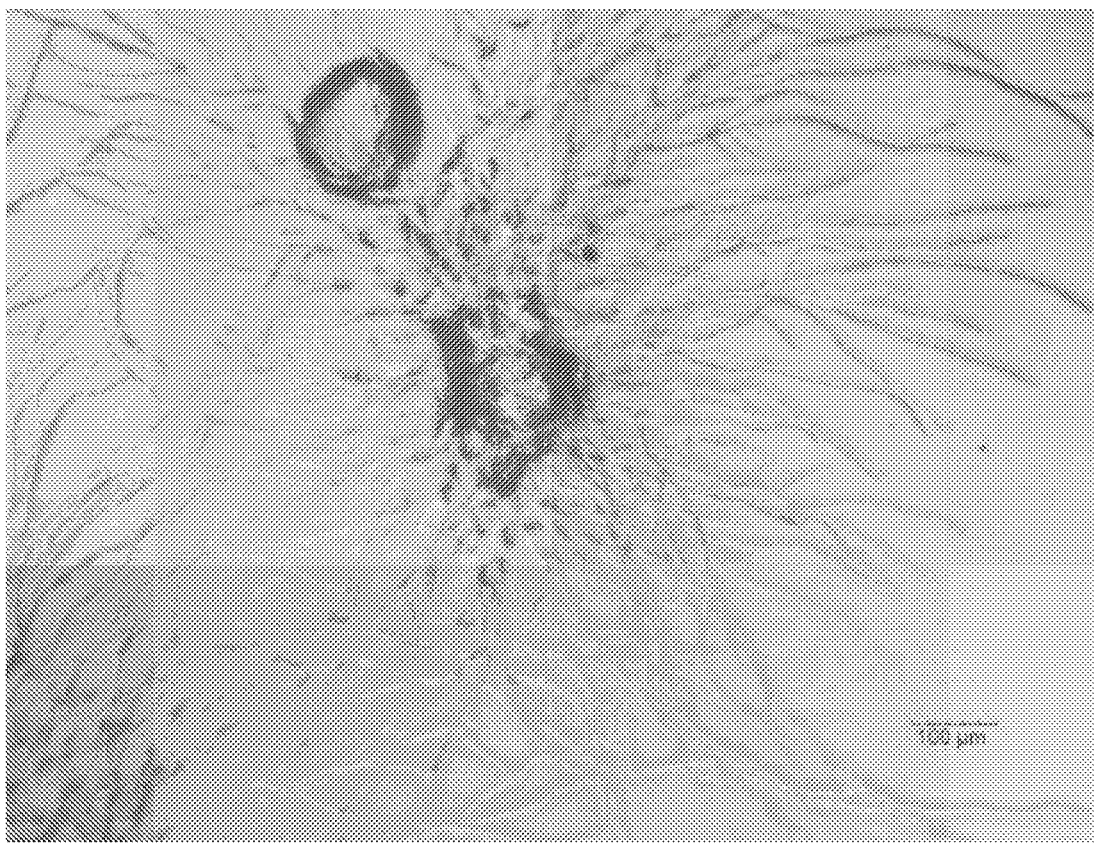
FIG. 35—An alginate capsule on the SDA surface showing intense mycelial growth.

After producing encapsulated spores using alginate, pectin and alginate with polymers (HPMC, MC, pectin, gum Arabic, Guar gum), the microcapsules suspension was plated on SDA plates. In all preparations the spores remained viable after encapsulation (FIG. 35).

Drying conditions on the storage stability of the incapsulated fungal spores.

The study by Horaczek, and Viernstein, 2004 [5] compared three commonly used drying technologies for preservation and formulation of 14-to 20-day-old aerial conidia of *Beauveria brongniartii* and *Metarhizium anisopliae*. Conidia were dispersed in an aqueous mixture of skim milk and polyvinylpyrrolidone (PVP K90) and subjected to lyophilization, spray- and fluid-bed drying. The initial heat stress tests revealed that *M. anisopliae* can tolerating exposure to 50° C. for 2 min without loss in viability. Lyophilization was the most destructive for *M. anisopliae* with viability level of 4% after freeze-drying. Both spray- and fluid-bed drying methods resulted in severe damage to the fungal

TABLE 5

Samples of microcapsules prepared using different co-polymers

| Sample number | Sample name | Polymers conc, % | Base polymer | Co-polymer | Base:co-polymer % | [Spores] | Cross-linker, g | Polymerisation time, min |
|---|---|---|---|---|---|---|---|---|
| 1 | SAFS000 | 4 | SA | — | — | ni | 1.0 | 120 |
| 2 | SAFS001 | 2 | SA | — | — | ~$10^{-3}$ | | 120 |
| 3 | SAFS002 | 2 | SA | — | — | ~$10^{-7}$ | | 120 |
| 4 | SAFS003 | 3 | SA | — | — | ~$10^{-7}$ | | 120 |
| 5 | SA | 2 | SA | — | — | ~$10^{-7}$ | 0.25 | 10, 20, 30, 40, 60, 120 |
| 6 | PE | 2 | Pectin | — | — | ~$10^{-7}$ | 0.25 | 30 |
| 7 | PE-2 | 2 | Pectin | — | — | ~$10^{-7}$ | 0.25 | 60 |
| 8 | SA + PE 7:3 | 2 | SA | Pectin | 30 | ~$10^{-7}$ | 0.25 | 40 |
| 9 | SA + HPMC 7:3 | 2 | SA | HPMC | 30 | ~$10^{-7}$ | 0.25 | 40 |
| 10 | SA + PE + HPMC 2:1:1 | 2 | SA | Pectin HPMC | 25, 25 | ~$10^{-7}$ | 0.25 | 40 |
| 11 | SA + HPMC 4:1 | 2 | SA | HPMC | 20 | ~$10^{-7}$ | 0.25 | 40 |
| 12 | SA + MC 4:1 | 2 | SA | MC | 20 | ~$10^{-7}$ | 0.25 | 40 |
| 13 | SA + HPMC 9:1 | 2 | SA | HPMC | 10 | ~$10^{-7}$ | 0.25 | 40 |
| 14 | SA + MC 9:1 | 2 | SA | MC | 10 | ~$10^{-7}$ | 0.25 | 40 |
| 15 | SA + MC 9:1 liq | 2 | SA | MC | 10 | ~$10^{-7}$ | 0.25 | 40 |
| 16 | SA$_{Sigma}$ | 1.5 | SA | — | — | ~$10^{-7}$ | 0.25 | 40 |
| 17 | SA$_{Acros}$ | 1.5 | SA | — | — | ~$10^{-7}$ | 0.25 | 40 |
| 18 | SA + GA | 2 | SA | Gum Arabic | 30 | ~$10^{-7}$ | 0.25 | 40 |
| 19 | SA + GG | 2 | SA | Guar Gum | 10 | ~$10^{-7}$ | 0.25 | 40 |

Microcapsules prepared using pectin only were stable only when suspended in water and agglomerate when air dried. Agglomeration happened independently of cross-linking time and this formulation was not considered for further study. Capsules prepared with higher concentration material already at an inlet/outlet temperature regime of 60/40±2° C., reflected by low and prolonged germination rates.

The results of germination tests by Horaczek, and Viernstein, 2004 show that lyophilization with a SM/PVP matrix is a promising drying method for *B. brongniartii* whereas the process resulted in complete loss of viability for *M. anisopliae*. According to authors, high germination rates had been achieved with atmospheric tray drying—a process by which organisms and carriers are slowly air-dried for 16 h or longer.

Figure 36:
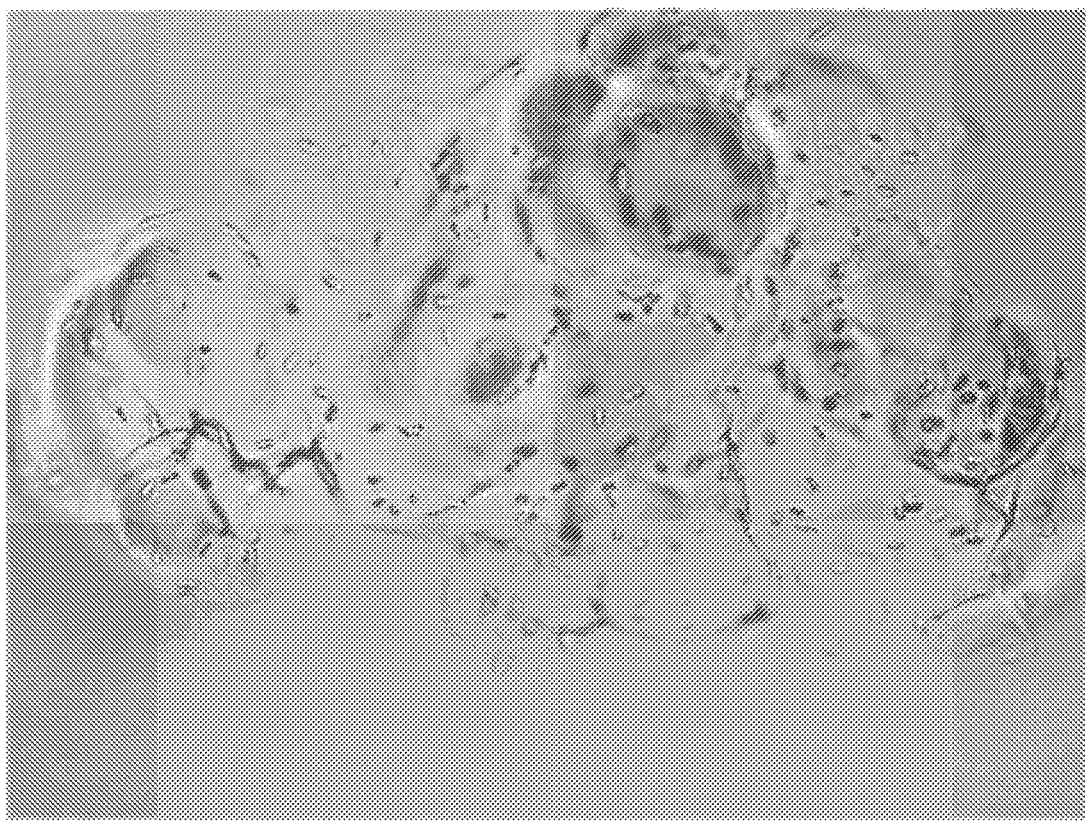
FIG. 36—An agglomeration of alginate microcapsules with spores after rehydration. Bar 100 μm.

Microencapsulated spores, which were air dried and stored at room temperature for 5 months, were viable after rehydration of the capsules. Within a rehydrated sample a part of microcapsules appeared to agglomerate (FIG. 36).

Mechanical strength of microcapsules for breakage by spraying.

Figure 37A:
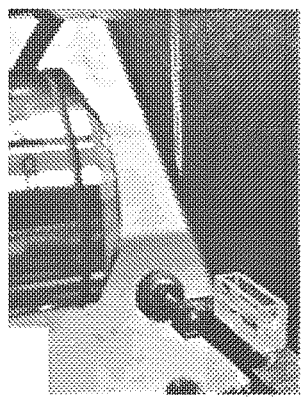
FIG. 37A-37C—Measuring mechanical strength of microcapsules at the micromanipulation rig in a dry mode (37A) and in a wet mode (37B); a capsule with spores. inside under the glass probe in water (37 C).
Figure 37B:
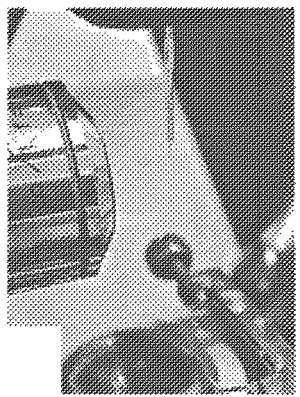
Figure 37C:
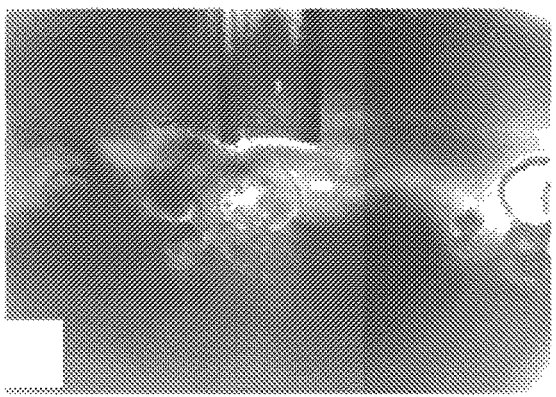

Mechanical properties of microcapsules were tested using micromanipulation technique. Dried microcapsules were dispersed on a glass slide (FIG. 37A) and placed under a glass probe which was attached to the force transducer (Model 402A, Aurora Scientific, Canada). The force transducer was driven by a motor, which allowed to control the distance and speed. The air-dried capsules were found to be tough (transducers force scale: 0.5 g, 1 g, 5 g; sensitivity accordingly ~0.5 mN/V, ~0.9 mN/V, ~4.5 mN/V). To estimate the mechanical strenth of wet capsules special small chamber was used (FIG. 37B) and nicromanipulation testing was conducted in water (FIG. 37C).

Due to the matrix nature of the cross-linked polymer comprising the capsules, they showed elastic-plastic behaviour and did not show a rupture under compression. The applied force nedded to achieve the same displacement within dry and wet spores was about 10 times less for wet capsules. This observation indicates that there is a high probability that wet capsules will be disrupted by a shier force in the process of spraying.

The suspension of alginate—HPMC microcapsules, when sprayed on a glass slide using small volume (100 ml) pulveriser, showed a rupture of capsules. This study is currently in progress.

Water retention capability of the broken microcapsules.

The moisture level was estimated using Satorius MA37 moisture balances. Before the moisture level measurements, the samples were air dried for 48 h then left for conditioning at humidity 58.7% and t=26.2° C. for 4 hours.

TABLE 6

Moisture level of the samples of spore-containing microcapsules

| Sample no | Sample name | Moisture, % |
|---|---|---|
| 1 | SA | 24.4 |
| 2 | PE-2 | NA |
| 3 | SA + PE 7:3 | 23.8 |
| 4 | SA + HPMC 7:3 | 14.3 |
| 5 | SA + PE + HPMC2:1:1 | 23.1 |
| 6 | SA + HPMC 4:1 | 13.04 |
| 7 | SA + MC 4:1 | 15.5 |
| 8 | SA + HPMC 9:1 | 18.5 |
| 9 | SA + MC 9:1 | 17.3 |
| 10 | SA + MC 9:1 aq CaCl$_2$ | 12.2 |

Alginate acts as a physical barrier and a humidity controller; compared to HPMC and MC, pectin is better in moisture retaining.

An important function of alginate encapsulation is UV-protective properties of alginate. According to Zohar-Perez et al., [6] dried alginate matrix transmitted an average of only 7.2% of UV radiation. Filler incorporation into the matrix significantly reduced UV transmission: Alginate with kaolin, bentonite and chitin transmitted an average of 0.15, 0.38 and 3.4% of the radiation, respectively [6]. Fillers incorporation into microcapsule formulations might be also used.

The viability of encapsulated spores after long storage in dried form and in oil suspension is also expected to be preserved.

It will be appreciated that the above described embodiments are given by way of example only and that various modifications may be made to the described embodiments without departing from the scope of the invention as defined in the appended claims. For example, various other additives, such as UV agents including, for example TiO$_2$, ZnO can be added to the composition, as can be appreciated by the skilled addressee. Further alternative embodiments may comprise different coating materials, such as, for example, lipids, which may be used to improve efficacy. Additional composition embodiments my comprise additional ions, or optimized by changing any the amounts, percentages, proportions, ratios or parameters defined herein, such as varying the amounts of additives or mixing time. Additional embodiments of the composition may be appreciated by the skilled reader to be developed for use with other insect-pathogenic fungal spores, such as, inter alia *Beauveria bassiana* and *Isaria fumosoroseus*.

REFERENCES

The following references are specifically incorporated herein by reference.

1. C. P. Liu & S. D. Liu, 2009. Journal of Microencapsulation, v. 26:5, p. 377-384, DOI: 10.1080/02652040802365455
2. Rodrigues et al., 2017. Acta Scientiarum. Agronomy, Maringá, v. 39, n. 4, p. 457-464
3. L. W. Chan, P. W. S. Heng and L. S. C. Wan, 1997. J. Microencapsulation, v. 14, n. 5, p. 545-555
4. J. Xue, Zh. Zhang, 2009. J Appl Polymer Sci, v. 113, p. 1619-1625
5. A. Horaczek, and H. Viernstein, 2004. Biological Control, v. 31 (1), p. 65-71
6. C. Zohar-Perez, L. Chernin, I. Chet, A. Nussinovitch, 2003. Structure of dried cellular alginate matrix containing fillers provides extra protection for microorganisms against UVC radiation. Radiat Res V. 160(2), p. 198-204.

What is claimed is:

1. A preparation comprising an insect-pathogenic *Metarhizium* var. *anisopliae* fungal strain, wherein said *Metarhizium* var. *anisopliae* fungal strain is a BNL 102 fungal strain having IMI CC Number 506834, wherein said preparation has an insecticidal activity against Western flower thrip (WFT) that is 2 to 3 times greater than a preparation without the BNL 102 fungal strain.

2. A preparation comprising fungal spores from a *Metarhizium* var. *anisopliae* fungal strain, wherein said *Metarhizium* var. *anisopliae* fungal strain is BNL 102 having CC Number 506834, wherein said preparation has an insecticidal activity against Western flower thrip (WFT) that is 2 to 3 times greater than a preparation without spores obtained from the BNL 102 fungal strain.

3. A preparation comprising blastospores of a BNL 102 fungal strain having IMI CC Number 506834.

4. A composition comprising:
the preparation of claim 1; and
an agronomically acceptable carrier comprising: bioplastic; polyacrylic acid; silica; zinc oxide; titanium dioxide; sodium selenosulfate; silver; hydrogel; carboxymethyl cellulose; methoxyl pectin; metal ions; chitosan; humectant; cellulose acetate; xantham gum; gum arabic; sodium alginate; chitosan; pectin citrus; arabinogalactan; alpha-cyclodextrin; maltodextrose; cellulose, or a combination thereof.

5. A powder or liquid comprising the composition of claim 4.

6. The composition of claim 4, wherein the hydrogel comprises sodium alginate.

7. The composition of claim 4, wherein the metal ions comprise copper ions, iron ions or a combination thereof.

8. The composition of claim 4, wherein the humectant comprises glycerol.

9. A microencapsulated preparation comprising the preparation of claim 1, wherein the preparation is encapsulated.

10. The microencapsulated preparation of claim 9, wherein the preparation contains fungal spores and particles having a size of between about 1 to about 100 nanometers (nm).

11. A method for controlling a population of insects comprising: providing a composition comprising the preparation of claim 1 to the insect population, and controlling the population of insects, wherein the composition has an insecticidal activity that is 2 to 3 times greater than a composition without the preparation of claim 1.

12. The method of claim 11, wherein the composition comprises an agronomically acceptable carrier comprising a bioplastic; polyacrylic acid; silica; zinc oxide; titanium dioxide; sodium selenosulfate; silver; hydrogel; carboxymethyl cellulose; methoxyl pectin; metal ions; chitosan; humectant; cellulose acetate; xantham gum; gum arabic; sodium alginate; chitosan; pectin citrus; arabinogalactan; alpha-cyclodextrin; maltodextrose; cellulose, or a combination thereof.

13. The method of claim 11 wherein the population of insects comprises: western flower thrip, weevils, aphids, whitefly, spider mites, caterpillars, chafers, ticks, midges, mosquitos or a combination thereof.

14. The method of claim 11 wherein the population of insects comprises: Western flower thrip (*Frankliniella occidentalis*); Spider mites (*Tetranychus urticae*); Whiteflies (*Aleyrodidae* spp); Aphids (*Myzus persicae*); Mosquitoes (*Aedes aegypti; Anopheles stephensi; Culex quinquefasciatus*); Ticks (*Ixodes* spp); Armyworms (*Spodoptera* littura); European May beetle (*Melolontha melolontha*); June beetle (*Hoplia philanthus*); Leatherjackets (*Tipula paludosa*); Wireworm (*Agriotes* spp); Biting midge (*Culicoides* spp); Vine weevil (*Otiorhynchus sulcatus*); Pine weevil (*Hylobius abietis*), or a combination thereof.

15. A composition comprising an aqueous liquid dispersion of conidia or blastospores of a substantially biologically pure *Metarhizium* var. *anisopliae* fungal strain, wherein said *Metarhizium* var. *anisopliae* fungal strain is a BNL 102 fungal strain having IMI CC Number 506834.

16. A method of controlling an insect population, comprising applying as a foliar spray an effective amount of the composition of claim 15.

* * * * *